US010290147B2

(12) United States Patent
Geselowitz et al.

(10) Patent No.: US 10,290,147 B2
(45) Date of Patent: May 14, 2019

(54) USING PERSPECTIVE TO VISUALIZE DATA

(71) Applicant: Microsoft Technology Licensing, LLC, Redmond, WA (US)

(72) Inventors: Lewey Geselowitz, Redmond, WA (US); Andrew Fitzgibbon, Cambridge (GB); Richard Banks, Egham (GB); Stephanie Horn, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

(21) Appl. No.: 14/823,260

(22) Filed: Aug. 11, 2015

(65) Prior Publication Data

US 2017/0046872 A1   Feb. 16, 2017

(51) Int. Cl.
| | |
|---|---|
| *G06T 15/20* | (2011.01) |
| *G06T 11/20* | (2006.01) |
| *G06T 19/00* | (2011.01) |
| *G06F 3/01* | (2006.01) |
| *G06F 3/0484* | (2013.01) |
| *G06F 3/0488* | (2013.01) |
| *G06T 19/20* | (2011.01) |

(52) U.S. Cl.
CPC ............ *G06T 15/205* (2013.01); *G06F 3/017* (2013.01); *G06F 3/0488* (2013.01); *G06F 3/04845* (2013.01); *G06T 11/206* (2013.01); *G06T 19/00* (2013.01); *G06T 19/20* (2013.01); *G06T 2200/04* (2013.01)

(58) Field of Classification Search
None
See application file for complete search history.

(56) References Cited

U.S. PATENT DOCUMENTS

| | | | | |
|---|---|---|---|---|
| 5,386,507 A | * | 1/1995 | Teig | ........................ G06T 17/00 715/836 |
| 5,632,009 A | | 5/1997 | Rao et al. | |
| | | | (Continued) | |

FOREIGN PATENT DOCUMENTS

WO          9927495 A1      6/1999

OTHER PUBLICATIONS

Braier, et al., "Haptic 3D Surface Representation of Table-Based Data for People With Visual Impairments", Association for Computing Machinery (ACM) Transactions on Accessible Computing, Dec. 2014, pp. 35, vol. 6, No. 1, Article 1, ACM.

(Continued)

*Primary Examiner* — Said Broome
(74) *Attorney, Agent, or Firm* — Ray Quinney & Nebeker, P.C.; Thomas M. Hardman; Patrick W. Evans

(57) ABSTRACT

A system is provided that allows a user to visualize data. A dataset that includes a plurality of data items arranged in a two-dimensional (2D) format is received. A request to visualize the dataset in three dimensions is then received. A three-dimensional (3D) visualization of the dataset is then generated based on this request. This 3D visualization adds a third dimension to the 2D arrangement of data items, where the extent of the third dimension is commensurate with the type and value of the data items. This 3D visualization includes an initial depiction of the dataset which is generated from a point of view that is specified by this request. The initial depiction of the dataset is then displayed on a display device of the system in lieu of the dataset itself.

19 Claims, 15 Drawing Sheets

(56) References Cited

U.S. PATENT DOCUMENTS

| | | | |
|---|---|---|---|
| 6,707,454 B1 | 3/2004 | Barg et al. | |
| 7,583,252 B2 * | 9/2009 | Kurtenbach | G02B 27/2271 345/156 |
| 8,826,113 B2 | 9/2014 | Ludwig | |
| 2003/0144868 A1 | 7/2003 | MacIntyre et al. | |
| 2004/0101194 A1 * | 5/2004 | Dawson | G06T 11/001 382/162 |
| 2005/0093867 A1 | 5/2005 | Bobrow et al. | |
| 2007/0188494 A1 | 8/2007 | Agutter et al. | |
| 2008/0144143 A1 * | 6/2008 | Solechnik | G01J 3/465 358/520 |
| 2012/0011474 A1 | 1/2012 | Kashik et al. | |
| 2012/0075324 A1 | 3/2012 | Cardno et al. | |
| 2013/0069948 A1 | 3/2013 | Dembo | |
| 2013/0145244 A1 | 6/2013 | Rothschiller et al. | |
| 2013/0307771 A1 | 11/2013 | Parker et al. | |
| 2014/0033063 A1 | 1/2014 | Rose et al. | |
| 2014/0043325 A1 | 2/2014 | Ruble et al. | |
| 2014/0100815 A1 * | 4/2014 | Dubuc | G06Q 10/10 702/152 |
| 2015/0033131 A1 | 1/2015 | Peev et al. | |
| 2015/0116318 A1 | 4/2015 | Obrien et al. | |

OTHER PUBLICATIONS

CAMOES, "excelcharts.com", Jun. 25, 2015. pp. 7, retrieved at <<http://www.excelcharts.com/blog/data-visualization-excel-users/excel-charts-pie-charts/>>.

KEIM, "Information Visualization and Visual Data Mining", Institute of Electrical and Electronics Engineers (IEEE) Transactions on Visualization and Computer Graphics, Jan.-Mar. 2002, pp. 100-107, vol. 7, No. 1, IEEE.

Uncharted Software Inc., "Uncharted Excel Visualizer", Jun. 29, 2015, pp. 1-8, Uncharted Software Inc., retrieved at <<https://uncharted.software/wp-content/uploads/2015/03/ExcelVizWhitepaper.pdf>>.

Dybdal, et al., "Gaze Input for Mobile Devices by Dwell and Gestures", In Proceedings of the Symposium on Eye Tracking Research and Applications, Mar. 28, 2012, pp. 225-228.

Learncheme, "3D Plots in Excel", Retrieved From <<https://www.youtube.com/watch?v=jUoo_7KQfO0>>, May 2, 2012, 3 Pages.

"International Search Report & Written Opinion Issued in PCT Application No. PCT/US2016/044138", dated Jan. 24, 2017, 18 Pages.

\* cited by examiner

300

| Dessert | Store | Units | Profit |
|---|---|---|---|
| Yogurt | Bellevue | 4543 | 17490.55 |
| Yogurt | Kirkland | 132 | 528 |
| Yogurt | Redmond | 143 | 250.25 |
| Yogurt | Seattle | 4242 | 16331.7 |
| Frozen Custa | Bellevue | 2343 | 4100.25 |
| Frozen Custa | Kirkland | 132 | 231 |
| Frozen Custa | Redmond | 231 | 612.15 |
| Frozen Custa | Seattle | 1213 | 4670.05 |
| Gelato | Bellevue | 555 | 1470.75 |
| Gelato | Kirkland | 2343 | 9020.55 |
| Gelato | Redmond | 235 | 622.75 |
| Gelato | Seattle | 231 | 404.25 |
| IceCream | Bellevue | 4242 | 16331.7 |
| IceCream | Kirkland | 555 | 2136.75 |
| IceCream | Redmond | 4543 | 17490.55 |
| IceCream | Seattle | 899 | 3461.15 |

306 → (header row)
304 (table)
302 (rows)

[Reset] [Sort] [Filter] [Graph] ... Quick Pivot

502 →

| Dessert | Store | Units | Profit |
|---|---|---|---|
| Yogurt | | 4543 | 17490.55 |
| Yogurt | Bellevue | | |
| Yogurt | Kirkland | 132 | 528 |
| Yogurt | Redmond | 143 | 250.25 |
| Yogurt | Seattle | 4242 | 16331.7 |
| Frozen Custa | Bellevue | 2343 | 4100.25 |
| Frozen Cust | Kirkland | 132 | 231 |
| Frozen Cust | Redmond | 231 | 612.15 |
| Frozen Cus | Seattle | 1213 | 4670.05 |
| Gelato | Bellevue | 555 | 1470.75 |
| Gelato | Kirkland | 2343 | 9020.55 |
| Gelato | Redmond | 235 | 622.75 |
| Gelato | Seattle | 231 | 404.25 |
| IceCream | Bellevue | 4242 | 16331.7 |
| IceCream | Kirkland | 555 | 2136.75 |
| IceCream | Redmond | 4543 | 17490.55 |
| IceCream | Seattle | 899 | 3461.15 |

USING PERSPECTIVE TO VISUALIZE DATA

BACKGROUND

The information technology revolution over the past several decades has resulted in the digitization of massive amounts of data and widespread user access to many different types of computing devices. For example, more than 500 million people worldwide currently use spreadsheets and other two-dimensional (2D) arrangements of data items on various types of computing devices, and in a wide variety of application contexts, for organizing, analyzing, manipulating, storing, and presenting various types of data in an editable tabular format. These people include students, consumers, and a myriad of information workers (also known as knowledge workers) having diverse backgrounds such as engineers, scientists, software developers, accountants, human resource and marketing managers, underwriters, financial analysts, and sales professionals, to name a few. Numerous spreadsheet applications are available. Spreadsheets and other 2D data layouts are also utilized within numerous other types of applications such as word processing applications, email applications, database management applications, calendar management applications, web browser applications, and various mobile applications.

Many different types of data can be organized, analyzed, manipulated and stored in spreadsheets. Examples of such data-types include text, numeric values, currency values, date and time values, functions, and images. Spreadsheets store data in one or more 2D arrays of cells which are known as worksheets, where each worksheet is organized in rows and columns. Each cell in each worksheet of a given spreadsheet can store a given text string, or numeric value, or currency value, or date value, or time value. Each cell in each worksheet of the spreadsheet can also store a given user-defined function that automatically calculates and displays a value that is based on the contents of one or more other cells in the spreadsheet (in other words, the contents of a given cell can be based on the contents of one or more other cells). This function can include a wide variety of different types of computational functions, computational operators, and conditional expressions. As such, a given cell in a given worksheet can reference one or more other cells in the worksheet, or one or more other cells in one or more other worksheets. A user of a spreadsheet can thus interactively edit (e.g., make changes to) any data that is stored in the spreadsheet and observe the effects on calculated values in the spreadsheet.

Given the foregoing, it will be appreciated that spreadsheets represent a major source of editable, computer-based data. It will also be appreciated that complex structures of multi-dimensional (e.g., hierarchical or tree-shaped) data can be stored in spreadsheets.

SUMMARY

Data visualization technique implementations described herein generally involve a system for allowing a user to visualize data. In one exemplary implementation a dataset that includes a plurality of data items arranged in a two-dimensional (2D) format is received. A request to visualize the dataset in three dimensions is then received. A three-dimensional (3D) visualization of the dataset is then generated based on this request. This 3D visualization adds a third dimension to the 2D arrangement of data items, where the extent of the third dimension is commensurate with the type and value of the data items. This 3D visualization includes an initial depiction of the dataset which is generated from a point of view that is specified by the request. The initial depiction of the dataset is then displayed on a display device of the system in lieu of the dataset itself.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more detailed description that is presented below.

DESCRIPTION OF THE DRAWINGS

The specific features, aspects, and advantages of the data visualization technique implementations described herein will become better understood with regard to the following description, appended claims, and accompanying drawings where:

FIG. 3 is a diagram illustrating an exemplary implementation, in simplified form, of a dataset that the user requests to visualize in three dimensions.

FIGS. 5-10 are diagrams illustrating exemplary implementations, in simplified form, of the data visualization GUI after the user has input various exemplary requests to manipulate the depiction of the dataset that is displayed in FIG. 4.

DETAILED DESCRIPTION

Figure 1:
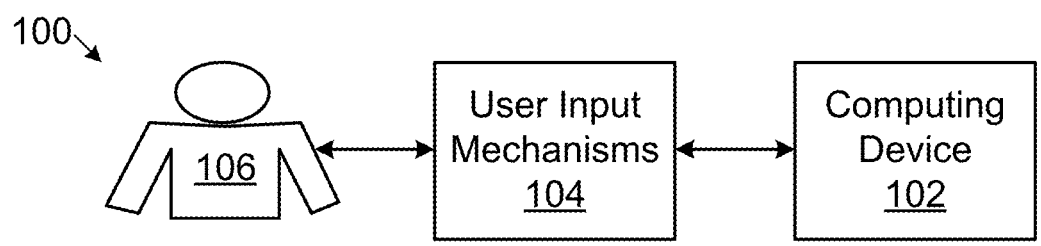
FIG. 1 is a diagram illustrating one implementation, in simplified form, of a system framework for realizing the data visualization technique implementations described herein.

In the following description of data visualization technique implementations reference is made to the accompanying drawings which form a part hereof, and in which are shown, by way of illustration, specific implementations in which the data visualization technique can be practiced. It is understood that other implementations can be utilized and structural changes can be made without departing from the scope of the data visualization technique implementations.

It is also noted that for the sake of clarity specific terminology will be resorted to in describing the data visualization technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version" means that a particular feature, a particular structure, or particular characteristics described in connection with the implementation or version can be included in at least one implementation of the data visualization technique. The appearances of the phrases "in one implementation", "in another implementation", "in an exemplary implementation", "in an alternate implementation", "in one version", "in another version", "in an exemplary version", and "in an alternate version" in various places in the specification are not necessarily all referring to the same implementation or version, nor are separate or alternative implementations/versions mutually exclusive of other implementations/versions. Yet furthermore, the order of process flow representing one or more implementations or versions of the data visualization technique does not inherently indicate any particular order nor imply any limitations of the data visualization technique.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Using Perspective to Visualize Data

Generally speaking, the data visualization technique implementations described herein allow users to visualize data using perspective. For example, the data visualization technique implementations provide a user with a quick and easy way to transform a given dataset that includes a plurality of data items which are arranged in a two-dimensional (2D) format into a meaningful three-dimensional (3D) visualization thereof. As will be described in more detail hereafter, rather than presenting the dataset and the 3D visualization thereof to the user as two separate entities, in an exemplary implementation of the data visualization technique the 3D visualization of the dataset is displayed in lieu of (e.g., in place of) the dataset itself (e.g., the 3D visualization replaces the dataset from which the 3D visualization is generated). In other words, in this exemplary implementation the user is provided with an integrated, composite (e.g., unified) view of (e.g. a single viewport into) the 3D visualization and its underlying and surrounding data; as will be appreciated from the more detailed description that follows, this is advantageous since it increases the efficiency of the user and their performance in interacting with the dataset. Once the 3D visualization of the dataset has been generated and displayed in lieu of the dataset itself, the data visualization technique implementations allow the user to dynamically interact directly with the 3D visualization in various ways and receive information of interest during the course of this direct interaction (in other words, the user does not have to go back and forth between the dataset and the 3D visualization thereof). By way of example but not limitation, the 3D visualization can be interactively manipulated by the user in a wide variety of ways examples of which will be described in more detail hereafter. As will also be described in more detail hereafter, the dataset from which the 3D visualization is generated can also be interactively manipulated by the user (e.g., edited, among other types of data manipulations) from within the 3D visualization itself (e.g., the user can modify a desired data item in the dataset without leaving the 3D visualization and immediately see the effect of this modification on the 3D visualization).

The data visualization technique implementations described herein are advantageous for various reasons including, but not limited to, the following. As will be appreciated from the more detailed description that follows, the data visualization technique implementations are intuitive, easy to use, and greatly increase user comprehension of data (e.g., the data visualization technique implementations enable a user to better and more quickly understand data without having to explicitly perform data analysis). The data visualization technique implementations also increase the quality of user interactions with data, and reduce the steps and time needed to visualize and gain meaningful insights into a given dataset. The data visualization technique implementations also provide users with a variety of useful data visualization and data manipulation features that allow users to efficiently and effectively present the dataset to others who may be less familiar with it and collaborate with them on the dataset. The data visualization technique implementations also provide users with a way to show the "shape" of the dataset to others.

More particularly, since the 3D visualization generated by the data visualization technique implementations described herein is presented to the user in lieu of the underlying and surrounding data from which the 3D visualization is generated, and since the 3D visualization can be interactively manipulated by the user, and since the dataset from which the 3D visualization is generated can also be interactively manipulated by the user from within the 3D visualization itself, the data visualization technique implementations provide the user with a deep connection between the 3D visualization and its underlying and surrounding data, where this deep connection is maintained regardless of how the user manipulates the 3D visualization or its underlying and surrounding data. This deep connection allows the user to rapidly analyze the data and quickly understand the correlation between the data and the 3D visualization thereof. The integrated, composite view of the 3D visualization and its underlying and surrounding data allows the user to quickly, and more efficiently and effectively, explore the data, perform ad hoc analyses and interactive editing of the data, discover trends in and extract other meaningful insights from the data, and share these trends and insights with others who may be less familiar with the data. The data visualization technique implementations also provide a smooth/seamless transition from the dataset to the 3D visualization thereof, and back again, which allows meaningful insights into the dataset to literally "pop off" the page/screen.

Additionally, the 3D visualization capabilities that are provided by the data visualization technique implementations described herein differ from the conventional conditional formatting functions that are provided by a conventional spreadsheet application in various ways such as the following. Unlike these conventional conditional formatting functions which are generally limited to coloring (which is generally not perceived as a visualization by users), the 3D visualization produced by the data visualization technique implementations is user-interactive and includes visual features that go far beyond coloring. The entry points into the 3D visualization produced by the data visualization technique implementations are easily discoverable by the user. For example, and as will be described in more detail hereafter, the entry point for requesting a specific depiction of the dataset can be input by the user via various natural user interface mechanisms (e.g., tilting a motion-enabled mobile computing device (such as a conventional smartphone, or a conventional tablet computer, or the like), or changing the orientation of their head while wearing conventional smartglasses). The data visualization technique implementations can also produce a 3D visualization for many different types of data including, but not limited to, text, numeric values, currency values, date and time values, and images.

As is appreciated in the art of data analysis, during the initial phase of data analysis a user will often visually scan the data in a given dataset for outliers (e.g., oddities and inconsistencies in the data). These outliers typically fall into two classes, namely, data entry errors and very interesting data. The data visualization technique implementations described herein are also advantageous in that they allow the user to quickly identify any outliers in the dataset and determine their cause, without losing their context with the underlying and surrounding data. The data visualization technique implementations also allow the user to update the data and correct any data entry errors within their current context, and immediately see the effect of each update/correction (e.g., the user can make data updates and corrections directly within the 3D visualization and it will be automatically updated to reflect the overall effect of these updates/corrections on the dataset).

After the user has utilized the data visualization technique implementations described herein to analyze, comprehend, discover trends in, and extract other meaningful insights from the dataset, the user can utilize the data visualization technique implementations to present and explain these findings to others who may not be familiar with the dataset. For example and as will be described in more detail hereafter, the user can utilize various data visualization and data manipulation features provided by the data visualization technique implementations to dynamically and directly interact with the 3D visualization and its underlying and surrounding data in a various ways that give the user the ability to answer questions from others on-the-fly and provide visual "proof" that certain trends, correlations and outliers exist in the dataset. The data visualization technique implementations allow others to easily grasp the trends, correlations and outliers based on the shape of the dataset being presented in the 3D visualization thereof. Since the user can interactively manipulate the 3D visualization (such as by rotating it to view it from a different perspective, among other types of interactive manipulations examples of which will be described in more detail hereafter), and the user can also interactively manipulate the dataset from which the 3D visualization is generated from within the 3D visualization itself, the data visualization technique implementations allow the user and others to collaboratively explore and discuss the dataset to answer new questions and gain additional insights into the dataset.

The data visualization technique implementations described herein can also be easily and efficiently utilized by any type of user, including one that has little or no training or expertise in data analysis. For example, the data visualization technique implementations can be easily and efficiently utilized by the aforementioned myriad of information workers who commonly have various levels of training/expertise in data analysis. User research in the field of data analysis has shown that information workers typically go through a data analysis journey that starts with acquiring a dataset and ends with presenting findings from their analysis of the dataset. One part of this journey involves verifying and "cleansing" the dataset (e.g., editing the dataset to correct data entry errors and remove unwanted outliers). Given the foregoing, it will be appreciated that the various data visualization and data manipulation features provided by the data visualization technique implementations allow information workers to quickly and effectively accomplish this task from within the 3D visualization itself.

The data visualization technique implementations described herein can also be easily and efficiently utilized by students and consumers who commonly have little or no training or expertise in data analysis. User research in the field of data analysis has shown that students and consumers have a need to understand a dataset, but often don't know how to begin their analysis of the dataset or even what insights they want to get from it. Given the foregoing, it will be appreciated that the various data visualization and data manipulation features provided by the data visualization technique implementations allow students and consumers to quickly and effectively analyze and discover trends in the dataset, and extract other meaningful insights from the dataset.

It is noted that the data visualization technique implementations described herein can be realized in various ways. By way of example but not limitation, the data visualization technique implementations can be realized in the form of an add-in module that can be installed into any conventional application that supports the management and display of a plurality of data items which are arranged in a 2D format. Examples of such an application include a conventional spreadsheet application, or a conventional word processing application, or a conventional email application, or a conventional database management application, or a conventional calendar management application, or a conventional web browser application, or various conventional mobile applications, among other types of applications. The data visualization technique implementations can also be integrated directly into such an application. The data visualization technique implementations can also be integrated into the display subsystem of a given computing device.

FIG. 1 illustrates one implementation, in simplified form, of a system framework for realizing the data visualization technique implementations described herein. As exemplified in FIG. 1, the system framework 100 includes a computing device 102 and one or more different user input mechanisms 104 which are utilized by a user 106 of the computing device 102 to input requests and other information into the computing device 102. As will be appreciated from the more detailed description that follows, the data visualization technique implementations are operational with a wide variety of user input mechanisms 104 including, but not limited to, those which are described in more detail hereafter.

Figure 11:
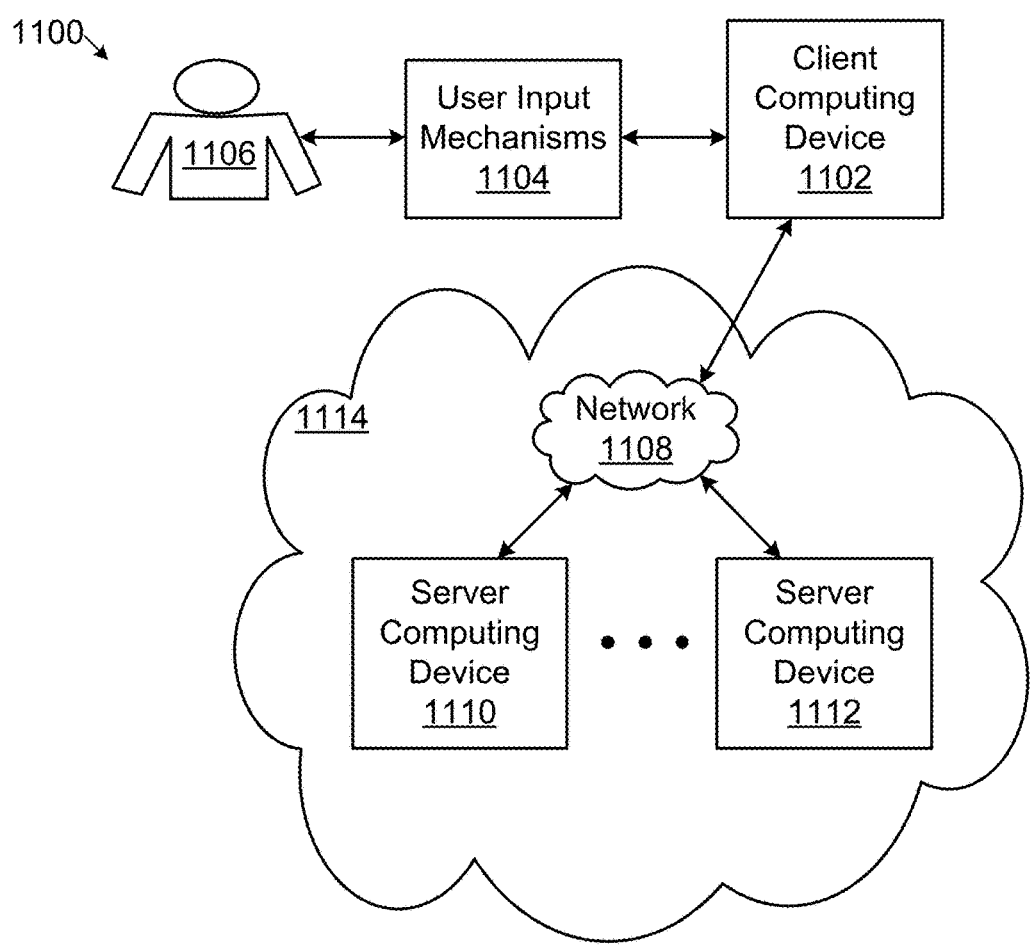
FIG. 11 is a diagram illustrating another implementation, in simplified form, of a system framework for realizing the data visualization technique implementations described herein.

FIG. 11 illustrates another implementation, in simplified form, of a system framework for realizing the data visualization technique implementations described herein. As exemplified in FIG. 11, the system framework 1100 includes a client computing device 1102 and one or more different user input mechanisms 1104 which are utilized by a user 1106 of the client computing device 1102 to input requests and other information into the client computing device 1102. The system framework 1100 also includes one or more server computing devices 1110 and 1112 that may be remote from the client computing device 1102, and may also be remote from each other. These server computing devices 1110 and 1112 are in communication with each other and with the client computing device 1102 via a data communication network 1108 (herein also referred to as a computer network). As such, the server computing devices 1110 and 1112 may be located in the cloud 1114.

1.1 Process Framework

Figure 2:
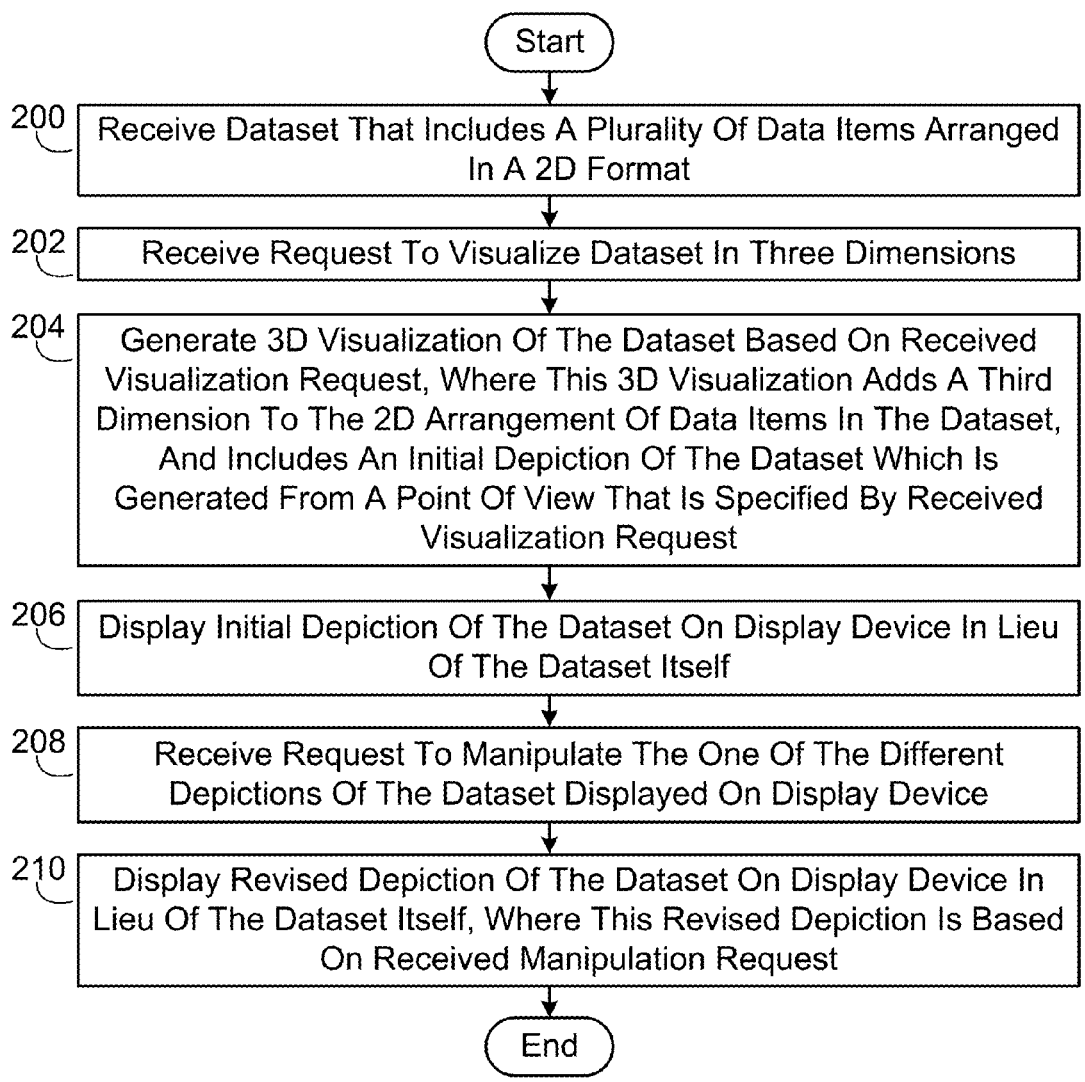
FIG. 2 is a flow diagram illustrating an exemplary implementation, in simplified form, of a process for allowing a user to visualize data, where this process is realized on the system framework illustrated in FIG. 1.

FIG. 2 illustrates an exemplary implementation, in simplified form, of a process for allowing a user to visualize data. The process illustrated in FIG. 2 is realized on the system framework 100 illustrated in FIG. 1. As exemplified in FIG. 2, the process starts with receiving a dataset that has been selected by the user, where this dataset includes a plurality of data items which are arranged in a 2D format (process action 200). In an exemplary implementation of the data visualization technique that is described in more detail hereafter the data items in the dataset are arranged in either a plurality of columns and one or more rows, or a plurality of rows and one or more columns, or a plurality of columns and a plurality of rows (e.g., the data items in the dataset are arranged in a tabular format such as that which is provided by a conventional spreadsheet application, among other types of conventional applications). It is noted however that alternate implementations of the data visualization technique are also possible where the data items in the dataset are arranged in a non-tabular 2D format.

FIG. 3 illustrates an exemplary implementation, in simplified form, of the just-described dataset. The dataset 300 exemplified in FIG. 3 includes a plurality of data items (e.g., data items 302 and 304) which are arranged in a plurality of columns and a plurality of rows, where one of the rows 306 is a header row. Each of the data items in the Dessert and Store columns is a text string, and each of the data items in the Units and Profit columns has a numeric value.

Referring again to FIG. 2, after the dataset has been received (action 200) a request to visualize the dataset in three dimensions is received from the user (process action 202). This visualization request can be input by the user via a wide variety of different user input mechanisms examples of which are described in more detail hereafter. In response to the received visualization request, a 3D visualization (e.g., a 3D visual representation) of the dataset is generated based on this request (process action 204), where this 3D visualization is rotatable (e.g., pivotable/tiltable) by the user. As will be appreciated from the more detailed description of the data visualization technique implementations that follows, this 3D visualization adds a third dimension (e.g., a height dimension) to the 2D arrangement of the data items in the dataset, where the third dimension may be added to both numeric data items and non-numeric data items (e.g., text and images, among other types of non-numeric data items), and the extent of the third dimension is commensurate with the type and value of the data items (e.g., for numeric data items the extent of the third dimension may be commensurate with the value of each data item, and for non-numeric data items the extent of the third dimension may be commensurate with either their sort order or the frequency of occurrence of each data item, among other factors). Additionally, this 3D visualization includes an initial depiction of the dataset which is generated from a point of view that is specified by the visualization request. The initial depiction of the dataset is then displayed on a display device in lieu of the dataset itself (process action 206).

As will also be appreciated from the more detailed description of the data visualization technique implementations that follows and referring again to FIG. 2, in one implementation of the data visualization technique the initial depiction of the dataset that is displayed on the display device (action 206) is generated from a point of view that is either precisely or substantially orthogonal to the 2D arrangement of the data items in the dataset and thus provides the appearance of a 2D depiction (e.g., a "head-on" depiction) of the dataset. In another implementation of the data visualization technique the initial depiction of the dataset that is displayed on the display device is generated from a prescribed point of view that is not precisely or substantially orthogonal to the 2D arrangement of the data items in the dataset and thus provides a 3D depiction of the dataset. This particular implementation is especially applicable to the case where the computing device that the user is utilizing to visualize the dataset (e.g., the computing device 102 illustrated in FIG. 1) is capable of displaying holographic images to the user.

Referring again to FIG. 2, after the initial depiction of the dataset has been displayed on the display device (action 206), a request to manipulate the initial depiction of the dataset that is displayed on the display device may be received from the user (process action 208). As will be appreciated from the more detailed description that follows, this manipulation request is initiated by the user from within the initial depiction of the dataset that is displayed on the display device. This manipulation request can be input by the user via the aforementioned wide variety of different user input mechanisms. In response to the received manipulation request, a revised depiction of the dataset is displayed on the display device in lieu of the dataset itself, where this revised depiction is based on the received manipulation request (process action 210).

The user can input a wide variety of different manipulation requests, where these requests can be generally classified into the following two categories. One category of manipulation requests changes the point of view along a path of rotation, thus rotating the 3D visualization of the dataset and allowing the user to interactively visualize the 3D aspects of the dataset from any perspective they desire. Another category of manipulation requests specifies a variety of different data operations including, but not limited to, a data sorting operation, a data filtering operation, a data graphing operation, and a data editing operation. Each of these data operations is described in more detail hereafter. It is noted that these exemplary data operations are but a small sample of the different types of data operations that can be supported by the data visualization technique implementations described herein. For example, in the case where the data visualization technique implementations are either installed or integrated directly into a conventional application that supports the management and display of a plurality of data items which are arranged in a 2D format, the data visualization technique implementations can support whatever data operations are provided by the application.

As will also be appreciated from the more detailed description of the data visualization technique implementations that follows, whenever the received manipulation request changes the point of view along a path of rotation, the revised depiction of the dataset will be generated from this changing point of view. In one implementation of the data visualization technique described herein this path of rotation is pre-defined. In another implementation of the data visualization technique the path of rotation is controlled by the user interactively. Whenever the received manipulation request selects one of the data items in the dataset, in an exemplary implementation of the data visualization technique the path of rotation is oriented around the selected data item. Whenever the received manipulation request does not select one of the data items in the dataset, in an exemplary implementation of the data visualization technique the path of rotation is oriented around the centroid of the initial depiction of the dataset that is displayed on the display device. Whenever the data items in the dataset are arranged in a plurality of columns and one or more rows, and the received manipulation request selects one or more of the columns, in an exemplary implementation of the data visualization technique the revised depiction of the dataset will add the third dimension to just the data items in the selected one or more columns. Similarly, whenever the data items in the dataset are arranged in a plurality of rows and one or more columns, and the received manipulation request selects one or more of the rows, in an exemplary implementation of the data visualization technique the revised depiction of the dataset will add the third dimension to just the data items in the selected one or more rows.

As will also be appreciated from the more detailed description of the data visualization technique implementations that follows, whenever the point of view from which a given depiction of the dataset is generated is not precisely or substantially orthogonal to the 2D arrangement of the data items in the dataset and thus provides a 3D depiction of the dataset, in an exemplary implementation of the data visualization technique described herein the intensity (e.g., brightness) of each of the data items in this 2D arrangement is determined based on the distance from the point of view to the data item, where this intensity decreases as this distance increases. In other words, the intensity/brightness of each of the data items in the depiction of the dataset varies based on its distance from the point of view, and is automatically modified as the 3D visualization is rotated by the user. Accordingly, data items that are farthest from the point of view will have the lowest intensity, and data items that are closest to the point of view will have the highest intensity. This variance in intensity simulates the effect of having a light source at the point of view and enhances the 3D aspect of the 3D visualization as it is interactively rotated by the user.

As will also be appreciated from the more detailed description of the data visualization technique implementations that follows, the extent of the third dimension that is added to the 2D arrangement of the data items in the dataset (herein sometimes simply referred to as the third dimension) can be determined using various methods. For example, whenever the data items in the dataset are arranged in a plurality of columns and one or more rows, in an exemplary implementation of the data visualization technique described herein the extent of the third dimension can be determined for each of the columns independently; this particular implementation is applicable to the case where one of the rows of data items is a header row and each column of data items has its own scale. Similarly, whenever the data items in the dataset are arranged in a plurality of rows and one or more columns, in an exemplary implementation of the data visualization technique the extent of the third dimension can be determined for each of the rows independently; this particular implementation is applicable to the case where one of the columns of data items is a header column and each row of data items has its own scale. Another implementation of the data visualization technique is also possible where the extent of the third dimension can be determined using a common scale across all of the columns and rows; this particular implementation is applicable to the case where one or more columns of data items have commonality in units of measure, or one or more rows of data items have commonality in units of measure.

As will also be appreciated from the more detailed description of the data visualization technique implementations that follows, whenever one or more the data items in the dataset has a numeric value, in an exemplary implementation of the data visualization technique described herein the extent of the third dimension for each of these one or more of the data items can be determined based on its numeric value. Whenever one or more the data items in the dataset is a text string, in an exemplary implementation of the data visualization technique described herein the extent of the third dimension for each of these one or more of the data items can be determined using a prescribed scoring function that maps the text string associated with the data item to a numeric value. It will be appreciated that various different scoring functions can be used. By way of example but not limitation, in one version of this scoring function implementation the scoring function can be a frequency of occurrence scoring function that assigns a numeric value to each of the text strings based on its frequency of occurrence in the dataset (e.g., text strings appearing more frequently in the dataset would be assigned a higher numeric value than those appearing less frequently in the dataset). In another version of this scoring function implementation the scoring function can be an alphabetic scoring function that assigns a numeric value to each of the text strings based on its textual characteristics (e.g., text strings starting with a letter near the beginning of the alphabet would be assigned a lower numeric value than text strings starting with a letter near the end of the alphabet).

Figure 12:
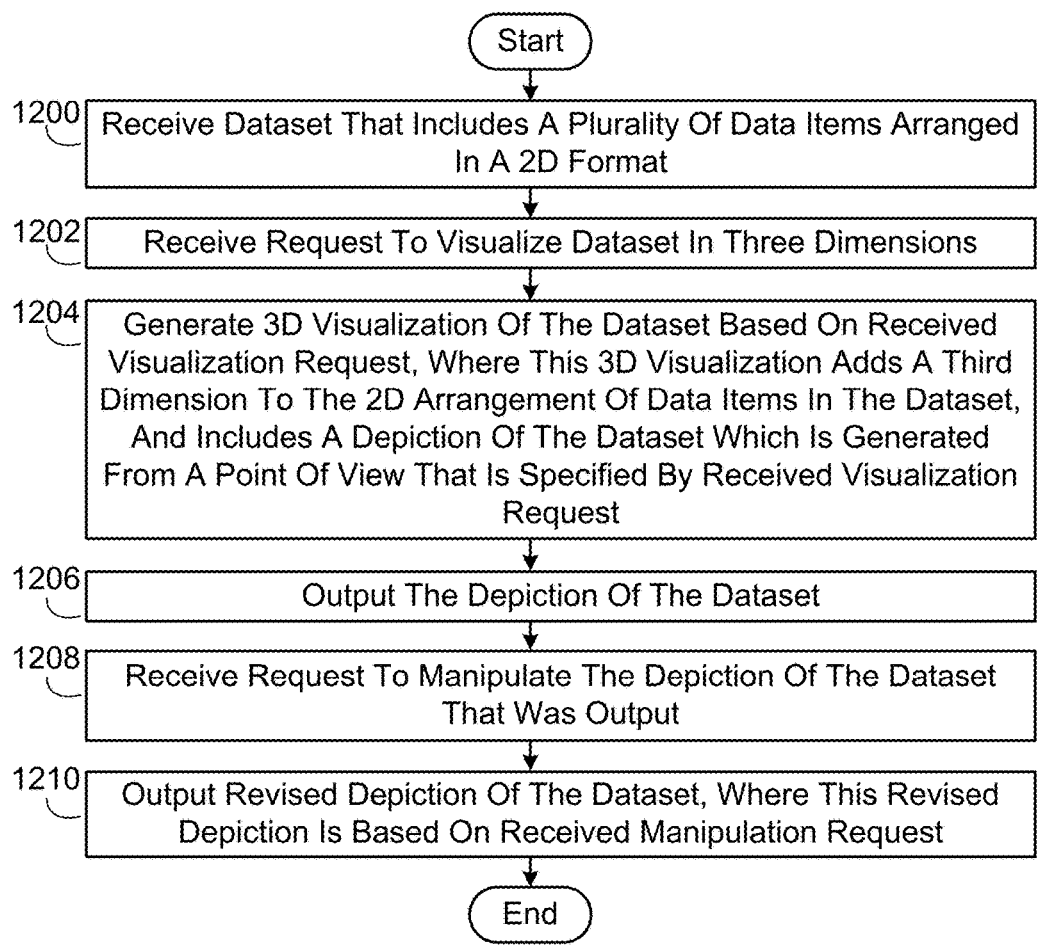
FIG. 12 is a flow diagram illustrating an exemplary implementation, in simplified form, of a data visualization process that is realized on the cloud portion of the system framework illustrated in FIG. 11.

FIG. 12 illustrates an exemplary implementation, in simplified form, of a data visualization process that is realized on the cloud 1114 portion of the system framework 1100 illustrated in FIG. 11. This particular process implementation is hereafter simply referred to as the cloud implementation. As exemplified in FIG. 12, the process starts with receiving a dataset that includes a plurality of data items which are arranged in a 2D format (process action 1200). In an exemplary version of the cloud implementation this dataset is stored the cloud 1114. A request to visualize the dataset in three dimensions is then received (process action 1202). In an exemplary version of the cloud implementation this visualization request is input by the user 1106 into the client computing device 1102 via one or more of the user input mechanisms 1104, and the client computing device then forwards the visualization request to the cloud 1114. In response to the received visualization request, a 3D visualization of the dataset is generated based on this request, where this 3D visualization includes a depiction of the dataset which is generated from a point of view that is specified by the received visualization request (process action 1204). The depiction of the dataset is then output (process action 1206) and sent to the client computing device 1102 for display to the user 1106. A request to manipulate the depiction of the dataset that was output may then be received (process action 1208). In an exemplary version of the cloud implementation this manipulation request is input by the user 1106 into the client computing device 1102 via one or more of the user input mechanisms 1104, and the client computing device then forwards the manipulation request to the cloud 1114. In response to the received manipulation request, a revised depiction of the dataset is output (process action 1210) and sent to the client computing device 1102 for display to the user 1106, where this revised depiction is based on the received manipulation request.

1.2 User Interface Framework

This section describes an exemplary user interface framework that can be employed to realize the various data visualization and data manipulation features provided by the data visualization technique implementations described herein. It is noted that the user interface framework described in this section is but one of a variety of different user interface frameworks that can be employed to realize the data visualization technique implementations.

Figure 4:
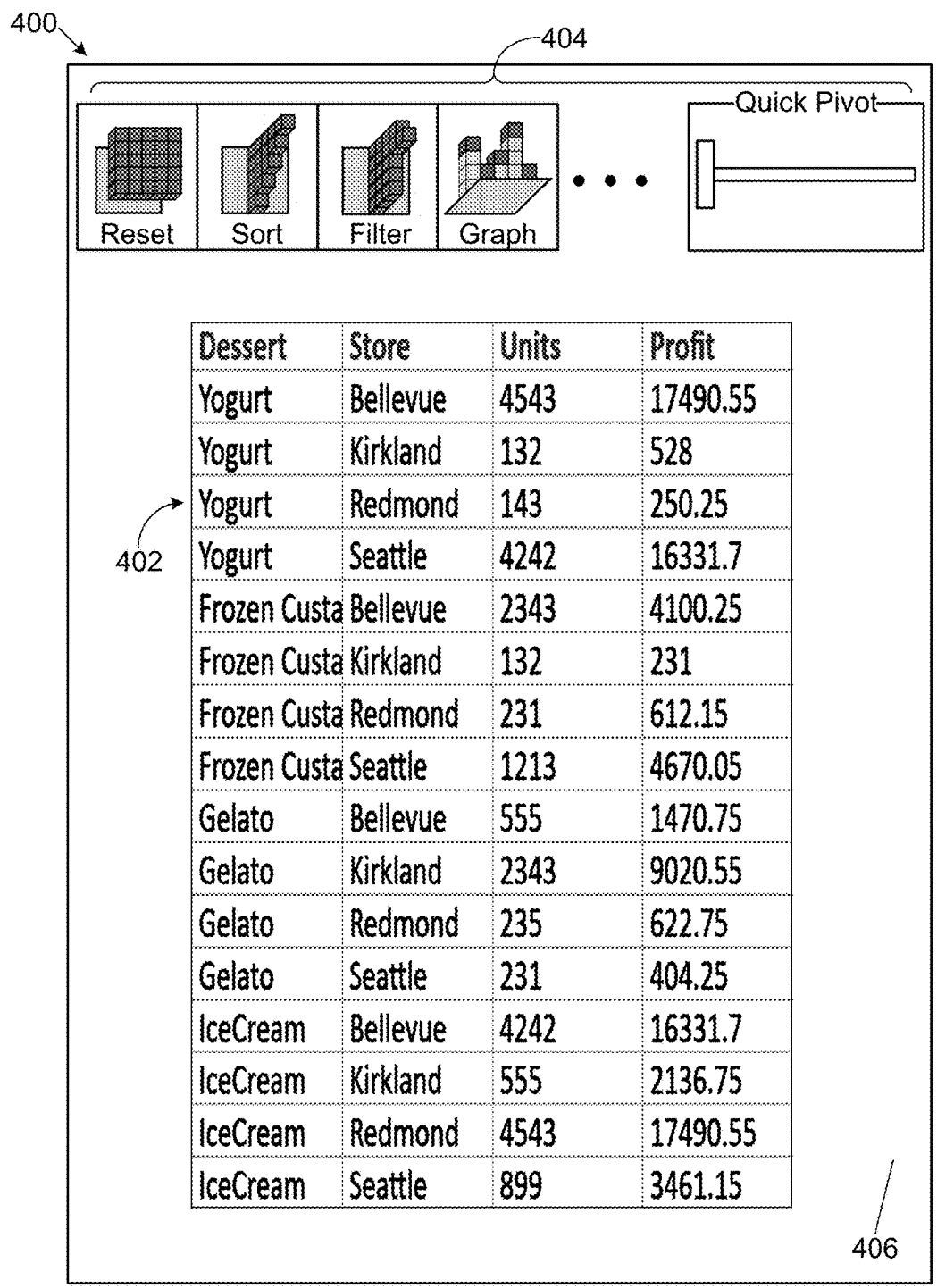
FIG. 4 is a diagram illustrating an exemplary implementation, in simplified form, of a generalized layout for a data visualization graphical user interface (GUI) that allows the user to visualize the dataset illustrated in FIG. 3 in three dimensions.

FIG. 4 illustrates an exemplary implementation, in simplified form, of a generalized layout for a data visualization graphical user interface (GUI) that allows a user to visualize data in three dimensions. Referring again to FIG. 3, the data visualization GUI 400 exemplified in FIG. 4 allows the user to input various requests to visualize the dataset 300 in three dimensions, and manipulate the resulting 3D visualization by dynamically interacting directly with it. These visualization and manipulation requests can be input by the user via a wide variety of different user interface mechanisms and various combinations thereof. Examples of these user interface mechanisms will be described in more detail hereafter. As described heretofore, when a given visualization request is received a 3D visualization of the dataset 300 is generated based on this visualization request, where this 3D visualization is rotatable by the user and includes an initial depiction of the dataset 300 which is generated from a point of view that is specified by the visualization request, and this initial dataset depiction 402 is displayed within the GUI 400. The particular dataset depiction 402 illustrated in FIG. 4 is generated from a point of view that is either precisely or substantially orthogonal to the 2D arrangement of data items and thus provides the appearance of a 2D depiction of the dataset 300. As will be appreciated from the foregoing description of the data visualization technique implementations and the description thereof that follows, the 3D visualization of the dataset 300 that is generated includes, but is not limited to, a 3D model that transforms upon user inspection from different angles.

Referring again to FIGS. 3 and 4, a variety of graphical control elements 404 are also displayed within the data visualization GUI 400. As will now be described in more detail, the user can utilize the graphical control elements 404 to input various requests to manipulate the dataset depiction 402 that is currently displayed within the data visualization GUI 400. In other words, each of the graphical control elements 404 is associated with a different data visualization feature of the data visualization technique implementations described herein. In the GUI 400 implementation that is illustrated in FIG. 4 the graphical control elements 404 include, but are not limited to, a Reset icon, a Sort icon, a Filter icon, a Graph icon, and a Quick Pivot slider. The different data visualization features that are associated with the graphical control elements 404 will now be described in more detail. It is noted that the graphical control elements and associated data visualization features that are described herein are exemplary. A wide variety of other types of icons and data visualization features may also be supported by the data visualization technique implementations.

Referring again to FIGS. 3 and 4, FIGS. 5-10 illustrate exemplary implementations, in simplified form, of the data visualization GUI 400 after the user has input various exemplary requests to manipulate the dataset depiction 402 that is displayed within the GUI of FIG. 4. As exemplified in FIGS. 5-10 (and also exemplified in FIGS. 14 and 15 which are described in more detail hereafter), in an exemplary implementation of the data visualization technique described herein the value of each of the data items is displayed on top of the third dimension that is added thereto. More particularly, FIG. 5 illustrates an exemplary implementation of the GUI 400 after the user has input a manipulation request that changes the point of view along a path of rotation, thus rotating the 3D visualization of the dataset 300 and allowing the user to interactively visualize the 3D aspects of the dataset from any perspective they desire. For simplicity sake this manipulation request is hereafter referred to as a rotation request. As described heretofore, when the rotation request is received a revised depiction 502 of the dataset 300 is displayed within the GUI 400, where this revised depiction 502 is generated from the changing point of view. The particular dataset depiction 502 illustrated in FIG. 5 is generated from a point of view that is a little to the right and a little beneath the point of view from which the dataset depiction 402 was generated.

Referring again to FIGS. 3-5, in one implementation of the data visualization technique described herein the user can input the rotation request by selecting and dragging the Quick Pivot slider, in which case the path of rotation is pre-defined and the amount of rotation is controlled by the slider. In the case where the user input mechanisms include a conventional mouse having a left mouse button and a right mouse button, whenever the user utilizes the left mouse button to select and drag the Quick Pivot slider while continuing to hold the left mouse button down, the revised depiction 502 of the dataset 300 will be displayed within the data visualization GUI 400 until the user releases the left mouse button, after which this revised depiction will be removed from the GUI and the dataset depiction 402 that was previously displayed within the GUI will be re-displayed within the GUI. Whenever the user utilizes the right mouse button to select and drag the Quick Pivot slider while continuing to hold the right mouse button down, the revised depiction 502 of the dataset 300 will persist (e.g., remain displayed) within the GUI 400 when the user releases the right mouse button. In another implementation of the data visualization technique the user can input the rotation request by selecting and dragging any part of the space 406 surrounding the dataset depiction 402 that is currently displayed within the GUI 400, in which case both the path and amount of rotation are controlled by the user interactively. In the case where the user input mechanisms include the aforementioned mouse, whenever the user utilizes the left mouse button to select and drag a given part of the space 406 surrounding the dataset depiction 402 while continuing to hold the left mouse button down, the revised depiction 502 of the dataset 300 will be displayed within the GUI 400 until the user releases the left mouse button, after which this revised depiction will be removed from the GUI and the dataset depiction 402 that was previously displayed within the GUI will be re-displayed within the GUI. Whenever the user utilizes the right mouse button to select and drag a given part of the space 406 surrounding the dataset depiction 402 while continuing to hold the right mouse button down, the revised depiction 502 of the dataset 300 will persist within the GUI 400 when the user releases the right mouse button.

Figure 6:
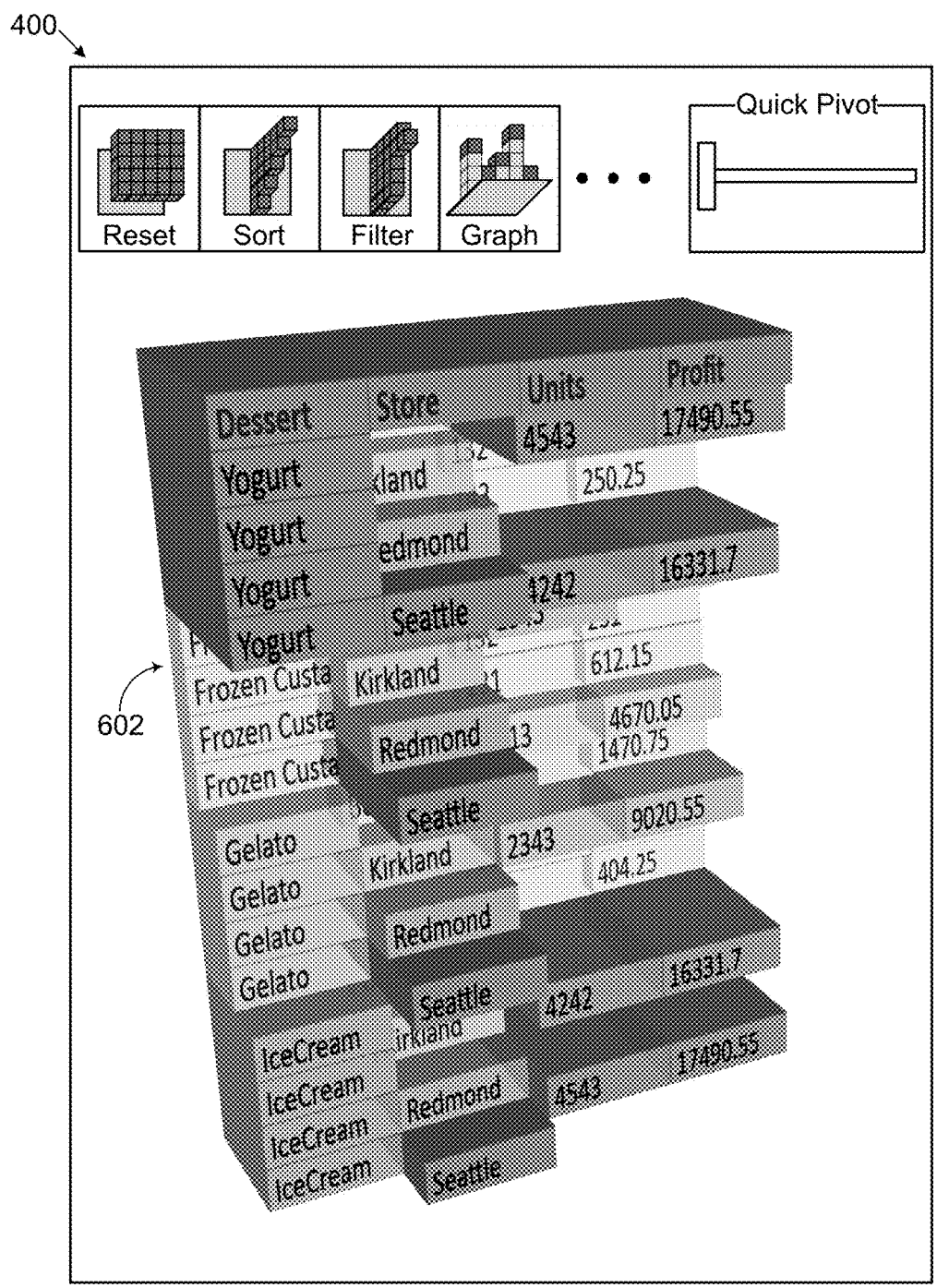
Figure 7:
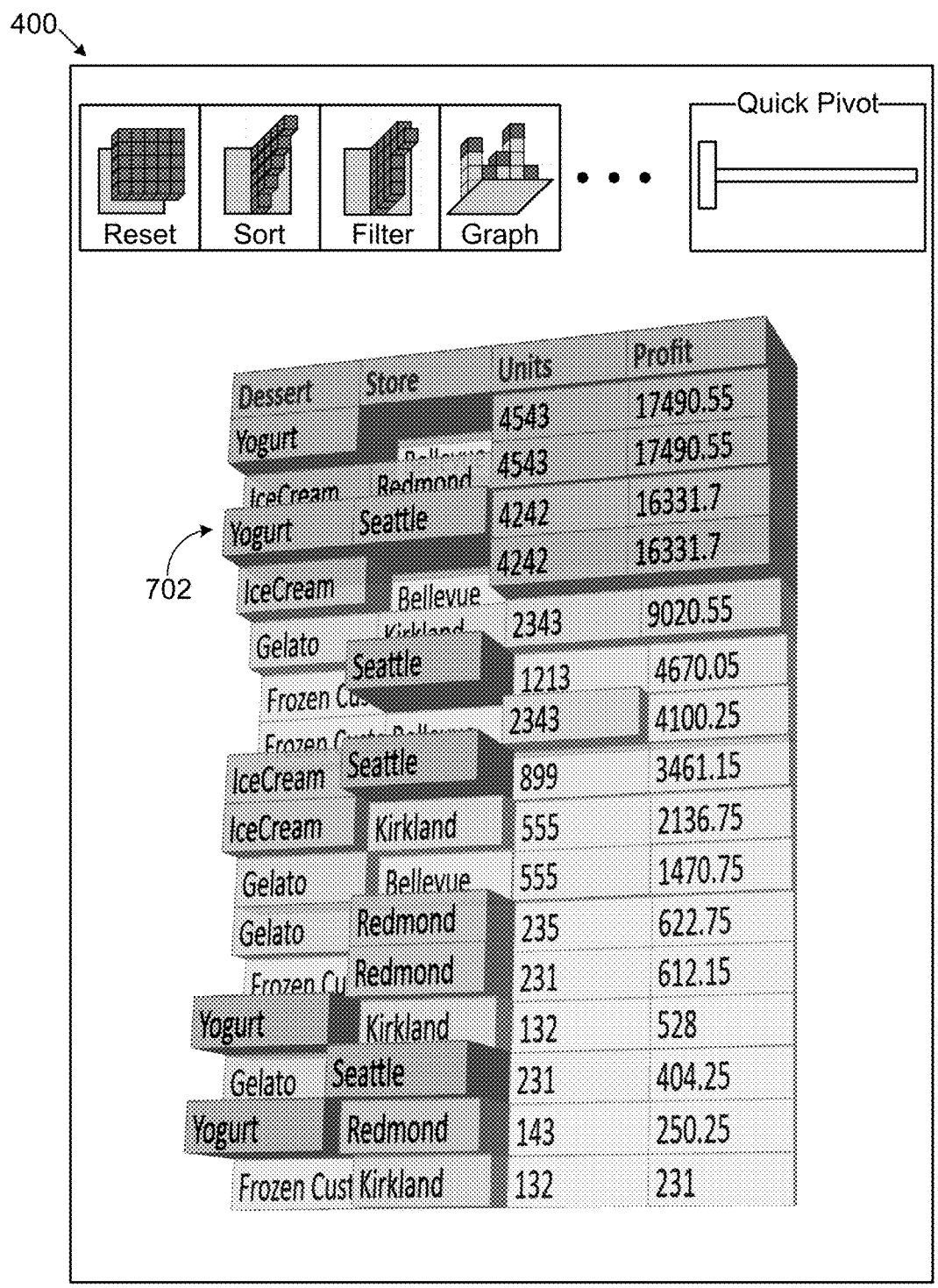
Figure 8:
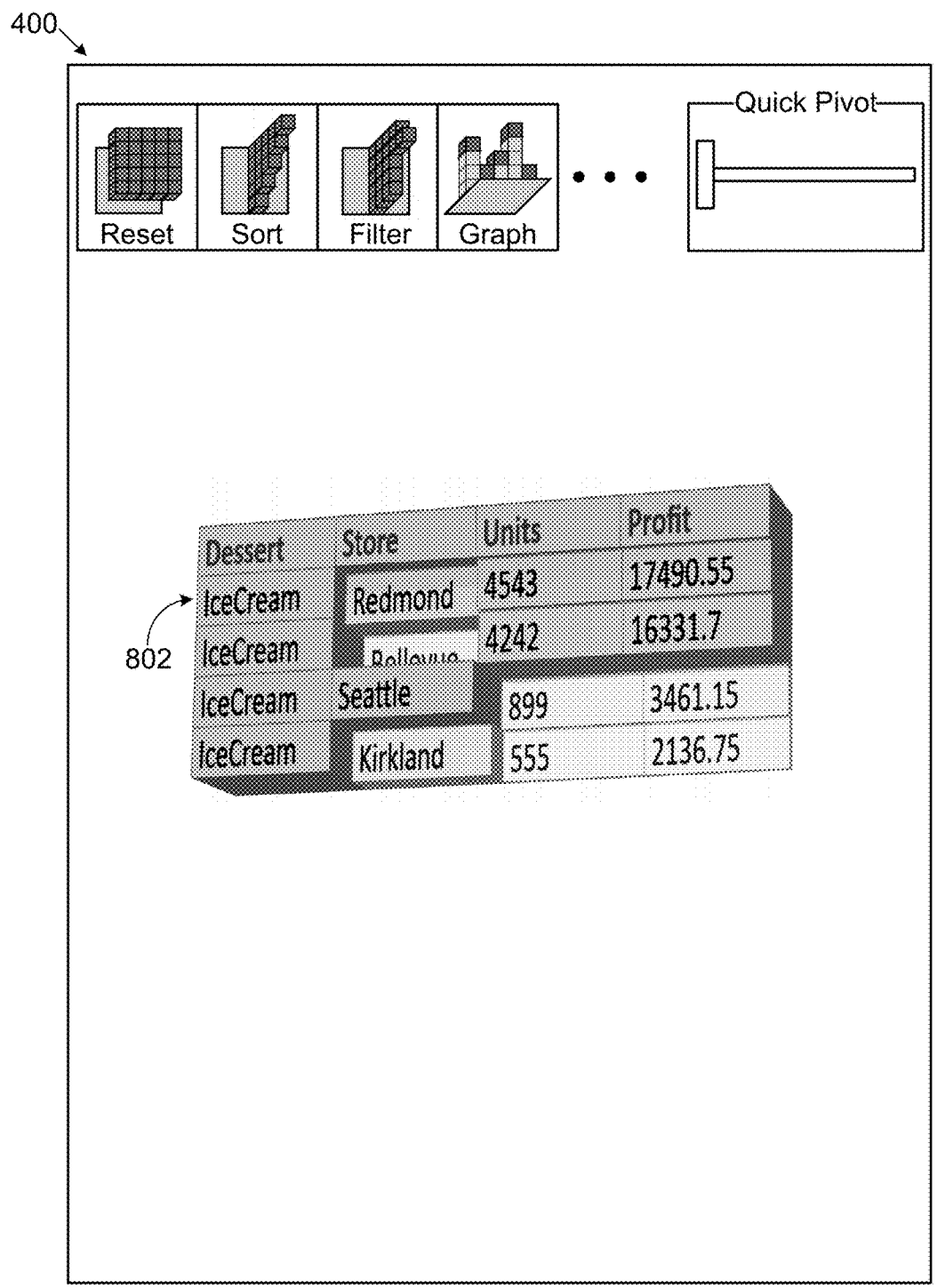
Figure 9:
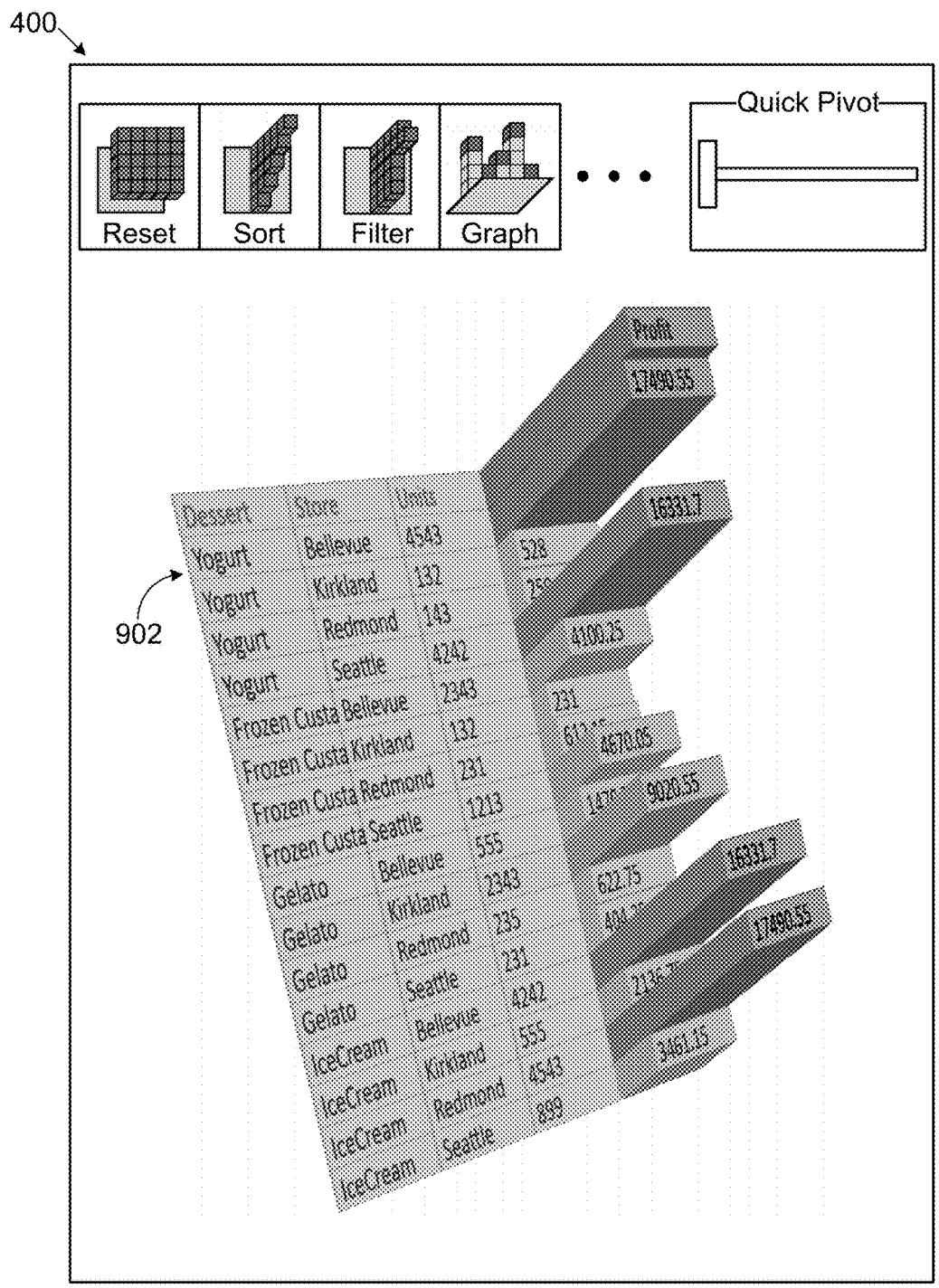
Figure 10:
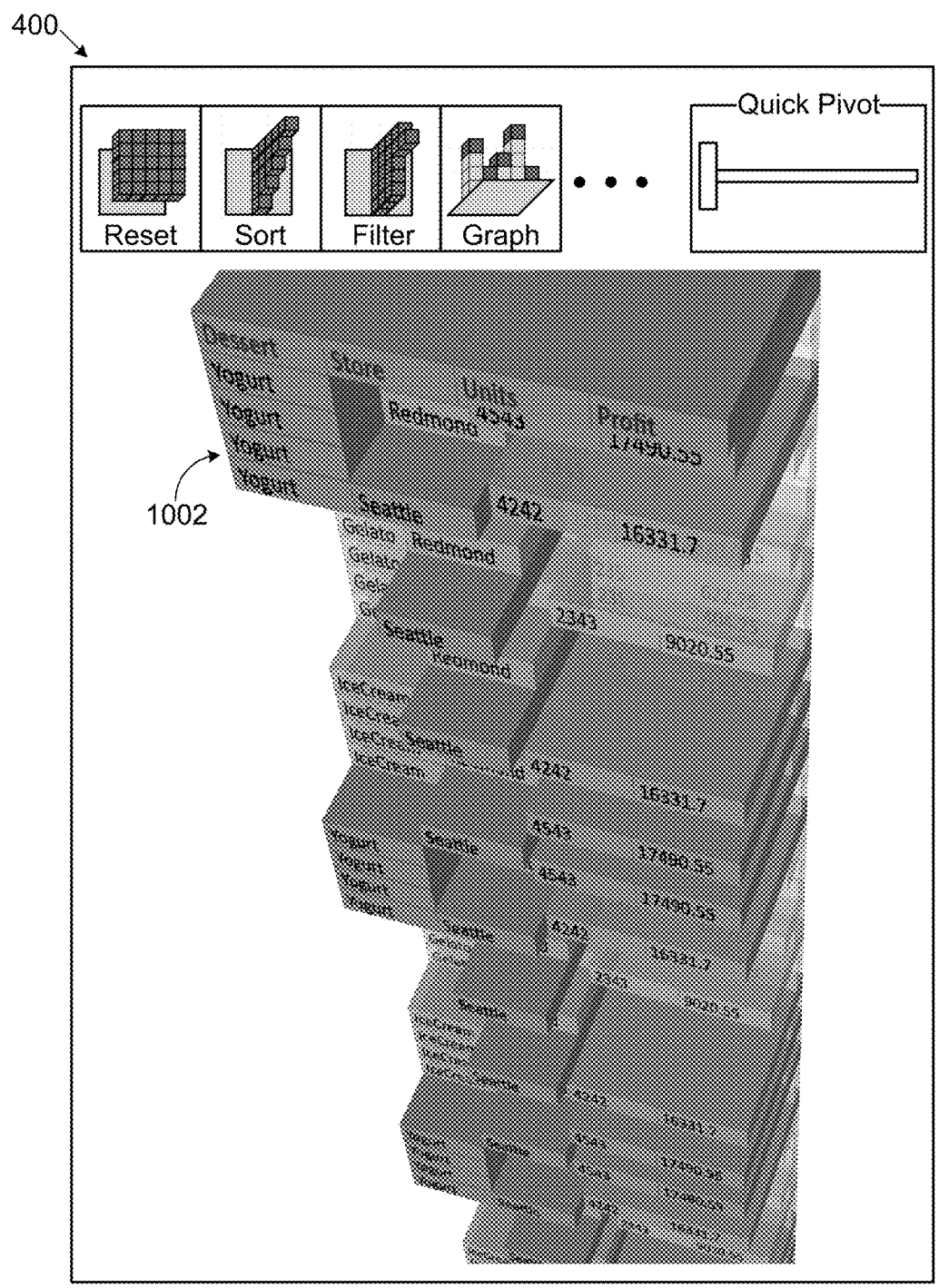

Referring again to FIG. 3, FIG. 6 illustrates an exemplary implementation of the data visualization GUI 400 after the user has input another rotation request that again changes the point of view along a path of rotation. When this rotation request is received, another revised depiction 602 of the dataset 300 is displayed within the GUI 400, where this revised depiction 602 is generated from the again changing point of view. The particular dataset depiction 602 illustrated in FIG. 6 is generated from a point of view that is to the left and above the point of view from which the dataset depiction 402 was generated.

Referring again to FIGS. 3 and 5, FIG. 7 illustrates an exemplary implementation of the data visualization GUI 400 after the user has input a manipulation request that specifies a data sorting operation that is to be performed on the dataset depiction 502 illustrated in FIG. 5. For simplicity sake this manipulation request is hereafter referred to as a sorting request. When the sorting request is received a revised depiction 702 of the dataset 300 is displayed within the GUI 400, where this revised depiction 702 is generated based on the specified data sorting operation. The particular dataset depiction 702 illustrated in FIG. 7 assumes that the user requested to sort the data items in the Profit column of the dataset 300 from largest to smallest numeric value. It is noted that the sorting request may also specify other types of sorting operations including, but not limited to, sorting the data items from smallest to largest numeric value. The user can input the sorting request in a variety of ways. By way of example but not limitation, the user can input the sorting request by selecting the aforementioned Sort icon, or by making a specific type of hand-based in-air gesture that is associated with the desired data sorting operation. Upon this selection, a pop-up menu (not shown) can be displayed within the GUI 400 that lists each of the different types of sorting operations that is available to the user, and the user can select the particular type of sorting operation they want to perform. Once the specified data sorting operation has been completed, the user can input another manipulation request to reverse the effect of this operation and re-display the dataset depiction 502 within the GUI 400. The user can input this reversal request in a variety of ways. By way of example but not limitation, the user can input the reversal request by selecting the aforementioned Reset icon, or by making a specific type of hand-based in-air gesture that is associated with the reversal operation.

Referring again to FIGS. 3 and 5, FIG. 8 illustrates an exemplary implementation of the data visualization GUI 400 after the user has input a manipulation request that specifies a data filtering operation that is to be performed on the dataset depiction 502 illustrated in FIG. 5. For simplicity sake this manipulation request is hereafter referred to as a filtering request. When the filtering request is received a revised depiction 802 of the dataset 300 is displayed within the GUI 400, where this revised depiction 802 is generated based on the specified data filtering operation. The particular dataset depiction 802 illustrated in FIG. 8 assumes that the user first selected the IceCream data item and then requested to filter the data items in the dataset 300 such that just the rows in the dataset having a data item in the column in which this selected data item resides that matches the selected data item are displayed. It is noted that the filtering request may also specify other types of filtering operations including, but not limited to, removing any rows in the dataset 300 which have a data item in the column in which the selected data item resides that matches the selected data item, or removing all of the rows in the dataset which have a data item in the column in which the selected data item resides whose numeric value is less than the numeric value of the selected data item, or removing all of the rows in the dataset which have a data item in the column in which the selected data item resides whose numeric value is greater than the numeric value of the selected data item, or displaying just the first occurrence of each value in the column in which the selected data item resides, or removing the row in which the selected data item resides. The user can input the filtering request in a variety of ways. By way of example but not limitation, the user can input the filtering request by selecting the aforementioned Filter icon, or by making a specific type of hand-based in-air gesture that is associated with the desired data filtering operation. Upon this selection, a pop-up menu (not shown) can be displayed within the GUI 400 that lists each of the different types of filtering operations that is available to the user, and the user can select the particular type of filtering operation they want to perform. Once the specified data filtering operation has been completed, the user can input another manipulation request to reverse the effect of this operation and re-display the dataset depiction 502 within the GUI 400. The user can input this reversal request in a variety of ways. By way of example but not limitation, the user can input the reversal request by selecting the Reset icon, or by making a specific type of hand-based in-air gesture that is associated with the reversal operation.

Referring again to FIGS. 3 and 4, FIG. 9 illustrates an exemplary implementation of the data visualization GUI 400 after the user has input a manipulation request that specifies a data graphing operation that is to be performed on the dataset depiction 402 illustrated in FIG. 4. For simplicity sake this manipulation request is hereafter referred to as a graphing request. When the graphing request is received a revised depiction 902 of the dataset 300 is displayed within the GUI 400, where this revised depiction 902 is generated based on the specified data graphing operation. The particular dataset depiction 902 illustrated in FIG. 9 assumes that the user requested to graph the data items in the Profit column of the dataset 300. In another implementation (not shown) of the data visualization technique described herein the user can also request to graph all of the data items in the dataset. The user can input the graphing request in a variety of ways. By way of example but not limitation, the user can input the graphing request by selecting the aforementioned Graph icon, or by making a specific type of hand-based in-air gesture that is associated with the desired data graphing operation. Upon this selection, a pop-up menu (not shown) can be displayed within the GUI 400 that lists each of the different types of graphing operations that is available to the user, and the user can select the particular type of graphing operation they want to perform. In the case where the dataset depiction that is currently displayed within the GUI includes just a subset of the data items in the dataset, this pop-up menu can provide the user with the option of either graphing the data items that are currently displayed within the GUI, or graphing all of the data items in the dataset. Once the specified data graphing operation has been completed, the user can input another manipulation request to reverse the effect of this operation and re-display the dataset depiction 502 within the GUI 400. The user can input this reversal request in a variety of ways. By way of example but not limitation, the user can input the reversal request by selecting the Reset icon, or by making a specific type of hand-based in-air gesture that is associated with the reversal operation.

In the case where the dataset depiction that is currently displayed within the data visualization GUI includes just a subset of the data items in the dataset, when a rotation request is received the revised depiction of the dataset that is displayed within the GUI in response to the rotation request may include additional data items that were not included in this currently displayed dataset depiction. For example, in the case where the dataset includes a plurality of columns of data items and the dataset depiction that is currently displayed within the GUI includes just a subset of these columns, when a rotation request is received that rotates the 3D visualization of the dataset either substantially leftward or rightward, additional columns of data items will be added to either the right side or the left side respectively of the revised depiction of the dataset, where the number of columns that is added depends on the degree of rotation. Similarly, in the case where the dataset includes a plurality of rows of data items and the dataset depiction that is currently displayed within the GUI includes just a subset of these rows, when a rotation request is received that rotates the 3D visualization of the dataset either substantially upward or downward, additional rows of data items will be added to either the bottom portion or the top portion respectively of the revised depiction of the dataset, where the number of rows that is added depends on the degree of rotation.

Referring again to FIG. 4, FIG. 10 illustrates an exemplary implementation of the data visualization GUI 400 after the user has input a rotation request that rotates the 3D visualization of the dataset substantially downward and leftward, where the revised depiction 1002 of the dataset that is displayed within the GUI in response to this rotation request includes additional rows of data items on the bottom portion of the depiction 1002 that were not visible in the dataset depiction 402 illustrated in FIG. 4.

In the case where the dataset depiction that is currently displayed within the data visualization GUI includes just a subset of the data items in the dataset, the user can also scroll the data that is displayed within this depiction in a desired direction (e.g., either upward, or downward, or leftward, or rightward, among other possible directions). The user can perform this scrolling in various ways. For example, the user can select and drag the dataset depiction in the desired direction. In the case where the user input mechanisms include a conventional keyboard, the user also can perform this scrolling by using the arrow keys on the keyboard. In the case where the GUI includes a conventional vertical scrollbar, the user also can scroll the data that is displayed within the dataset depiction either upward or downward by selecting and dragging the vertical scrollbar. In the case where the GUI includes a conventional horizontal scroll bar, the user also can scroll the data that is displayed within the dataset depiction either leftward or rightward by selecting and dragging the horizontal scrollbar. In the case where the user input mechanisms include a conventional mouse having a scroll wheel, the user also can scroll the data that is displayed within the dataset depiction either upward or downward by using the scroll wheel.

The user may also input a manipulation request that specifies a data editing operation that is to be performed on the dataset depiction that is currently displayed within the data visualization GUI. For simplicity sake this manipulation request is hereafter referred to as an editing request. When the editing request is received a revised depiction of the dataset is displayed within the GUI, where this revised depiction is generated based on the specified data editing operation. For example, the user can input an editing request that modifies (e.g., changes the value of, among other types of modifications) a given data item in the dataset and the depiction of the dataset that is displayed within the GUI will be updated to reflect the effect of this data item modification on the dataset. Referring again to FIG. 5, in an exemplary implementation of the data visualization technique described herein the user can input such an editing request by simply selecting a given data item 504 in the dataset depiction 502 that is currently displayed within the GUI 400, and then entering the desired modification to this data item 504 (e.g., the user might enter a correction to the number of units of ice cream that were sold in the Seattle store). The dataset depiction 502 will then be automatically updated accordingly, thus allowing the user to immediately observe the effect of their modification to the data item 504 in the 3D visualization.

1.3 User Input Mechanisms

Modern day users commonly utilize various types of computing devices to organize, analyze, manipulate, store, and present various types of data in a wide variety of application contexts. Examples of such computing devices include, but are not limited to, a conventional smartphone, a conventional tablet computer, a conventional laptop computer (also known as a notebook computer), a conventional desktop computer, a conventional wearable computer (e.g., a smartwatch, and smartglasses, among other types of wearable computers), a conventional surface computer (also known as a tabletop computer), and a conventional video game console (e.g., the WII™ (a trademark of Nintendo), the PLAYSTATION® (a registered trademark of Sony Computer Entertainment Inc.), and the XBOX® (a registered trademark of Microsoft Corporation), among other types of video game consoles). As is appreciated in the art of computing devices, each of these exemplary types of computing devices supports one or more different user input mechanisms examples of which are described in more detail hereafter, where a given user is generally free to choose from any of these user input mechanisms and dynamically change the particular user input mechanism they are currently utilizing at will. As will be appreciated from the more detailed description that follows, the data visualization technique implementations described herein are operational with any type of computing device that includes a display device and takes input from a user via one or more different user input mechanisms.

The term "screen-contacting gesture" is used herein to refer to either a physical tap, or stroke, or compound stroke that is made by a user directly on a touch-sensitive display screen of a computing device. It will be appreciated that the user can make a given screen-contacting gesture using various modalities such as a stylus or pen (hereafter simply referred to as a stylus for simplicity) which is held by the user, or a finger of the user, or the like. The term "non-screen-contacting gesture" is used herein to refer to any type of gesture that is made by a user of a computing device which does not contact a display screen of the computing device. It will also be appreciated that the user can make a given non-screen-contacting gesture using various modalities. By way of example but not limitation, in one implementation of the data visualization technique described herein the user can make a given non-screen-contacting gesture using their gaze (e.g., the user can gaze at a given element that is displayed on the display screen of the computing device, or a given region thereof); such a gesture is hereafter simply referred to as a gaze-based gesture. In another implementation of the data visualization technique the user can make a given non-screen-contacting gesture using one or both of their hands to make a prescribed in-air gesture which can be either substantially static or substantially moving; such a gesture is hereafter simply referred to as a hand-based in-air gesture. In yet another implementation of the data visualization technique the user can make either a given in-air selection or a given non-screen-contacting gesture using a handheld remote controller such as the WII REMOTE™ (a trademark of Nintendo), or the PLAYSTATION®MOVE (a registered trademark of Sony Computer Entertainment Inc.), among other types of handheld remote controllers.

The term "touch-enabled computing device" is used herein to refer to a computing device that includes a touch-sensitive display screen which can detect the presence, location, and path of movement if applicable, of screen-contacting gestures that a user makes on the display screen, and then interpret the gestures. The touch-sensitive display screen can be either integrated into the computing device, or externally connected thereto in either a wired or wireless manner. The term "voice-enabled computing device" is used herein to refer to a computing device that includes an audio input device such as one or more microphones, or the like, which can capture speech that a user utters and then interpret (e.g., recognize) the speech. The audio input device can be either integrated into the computing device, or externally connected thereto in either a wired or wireless manner. The term "vision-enabled computing device" is used herein to refer to a computing device that includes a user-facing video input device such as one or more video cameras, or the like, which can detect the presence of non-screen-contacting gestures that a user makes, and then interpret the gestures. The user-facing video input device can be either integrated into the computing device, or externally connected thereto in either a wired or wireless manner. The term "motion-enabled computing device" is used herein to refer to a computing device that includes a motion sensing device such as an accelerometer, or the like, which can detect the magnitude and direction of movements of the computing device that are made by a user, and then interpret the movements. For example, the user may tilt the computing device in a desired direction in order to move a cursor on the computing device's display screen in this general direction, and the user may perform a drop-like gesture with the computing device in order to select a given element that is displayed on the computing device's display screen. The user may also tilt the computing device in a desired direction in order to rotate the 3D visualization of a given dataset in this general direction.

The data visualization technique implementations described herein are operational with a wide variety of user input mechanisms that may be supported by a given computing device. By way of example but not limitation, the user input mechanisms can include a physical keyboard that is either integrated into the computing device or externally connected thereto in either a wired or wireless manner. The user input mechanisms can also include a mouse that is externally connected to the computing device in either a wired or wireless manner. The user input mechanisms can also include a trackpad (also known as a touchpad) that is either integrated into the computing device or externally connected thereto in either a wired or wireless manner. The user input mechanisms can also include a handheld remote controller that is externally connected to the computing device in a wireless manner. In the case where the computing device is touch-enabled, the user input mechanisms can also include finger-based screen-contacting gestures and stylus-based screen-contacting gestures that are made by a user. In the case where the computing device is voice-enabled, the user input mechanisms can also include speech that a user utters. In the case where the computing device is vision-enabled, the user input mechanisms can also include gaze-based gestures and hand-based in-air gestures that are made by a user. In the case where the computing device is motion-enabled, the user input mechanisms can also include movements of the computing device that are made by a user.

As is appreciated in the art of computer user interfaces (UIs), each of the just-described different user input mechanisms has its own set of strengths and weaknesses. For example, because of various factors a mouse, a trackpad, a physical keyboard, and stylus-based screen-contacting gestures are generally more precise user input mechanisms than finger-based screen-contacting gestures, hand-based in-air gestures, gaze-based gestures, speech, and a handheld remote controller. More particularly and by way of example, user input from a mouse, a trackpad, and stylus-based screen-contacting gestures generally provide high precision x-y coordinate data to the application. User input from a mouse, a trackpad, and a physical keyboard also generally manipulates a cursor on the computing device's display screen to assist with targeting. User input from a physical keyboard is also explicit. User input from stylus-based screen-contacting gestures generally does not manipulate a cursor to assist with targeting. User input from finger-based screen-contacting gestures generally provides lower precision x-y coordinate data to the application (due to the larger contact area associated with a user's fingertip) and does not manipulate a cursor to assist with targeting. The precision of user input from speech is generally dependent on various factors such as the particular speech interpretation/recognition method that is employed by the computing device, the quality and configuration of the particular audio input device that is employed thereby, and the level and nature of any background noise that may be present in the user's current environment. User input from speech generally does not manipulate a cursor to assist with targeting. The precision of user input from gaze-based gestures is generally dependent on various factors such as the particular gaze interpretation/recognition method that is employed by the computing device, the quality and configuration of the particular video input device that is employed thereby, and the lighting conditions in the user's current environment. User input from gaze-based gestures generally does not manipulate a cursor to assist with targeting. The precision of user input from hand-based in-air gestures is generally dependent on various factors such as the particular in-air gesture interpretation/recognition method that is employed by the computing device, the quality and configuration of the particular video input device that is employed thereby, and the lighting conditions in the user's current environment. User input from hand-based in-air gestures generally manipulates a cursor to assist with targeting, as does user input from a handheld remote controller.

As is also appreciated in the art of computer UIs, the term "natural user interface" (NUI) refers to a class of user input mechanisms that allow a user to operate and interact with a computing device through actions which are intuitive to the user and correspond to their natural, everyday behavior. As such, user input mechanisms that can be classified as a NUI are advantageous. User input mechanisms such as stylus-based and finger-based screen-contacting gestures, gaze-based gestures, hand-based in-air gestures, speech, and a handheld remote controller can be classified as a NUI. Additionally, certain user input mechanisms may support specific features that are not supported by other user input mechanisms. For example, user input mechanisms such as a mouse, a trackpad, a handheld remote controller, and hand-based in-air gestures may support a hovering feature that allows the user to hover the cursor over a given element that is displayed on the computing device's display screen for a prescribed period of time, after which a pop-up may be displayed on the screen which may include various types of information associated with the element such as a menu of items related to the element that the user may select from, or additional information about the element, among other things. The finger-based screen-contacting gestures user input mechanism may also support a hovering feature that allows the user to hover their finger over a given element that is displayed on the computing device's touch-sensitive display screen for a prescribed period of time, after which the just-describe pop-up is displayed on the screen.

2.0 Other Implementations

While the data visualization technique has been described by specific reference to implementations thereof, it is understood that variations and modifications thereof can be made without departing from the true spirit and scope of the data visualization technique. By way of example but not limitation, rather than providing the user the ability to input the aforementioned editing request that allows the user to modify the underlying and surrounding data from which the 3D visualization is generated, the user can be prevented from performing such a data modification (e.g., the dataset that the user requests to visualize in three dimensions can be read-only).

Figure 14:
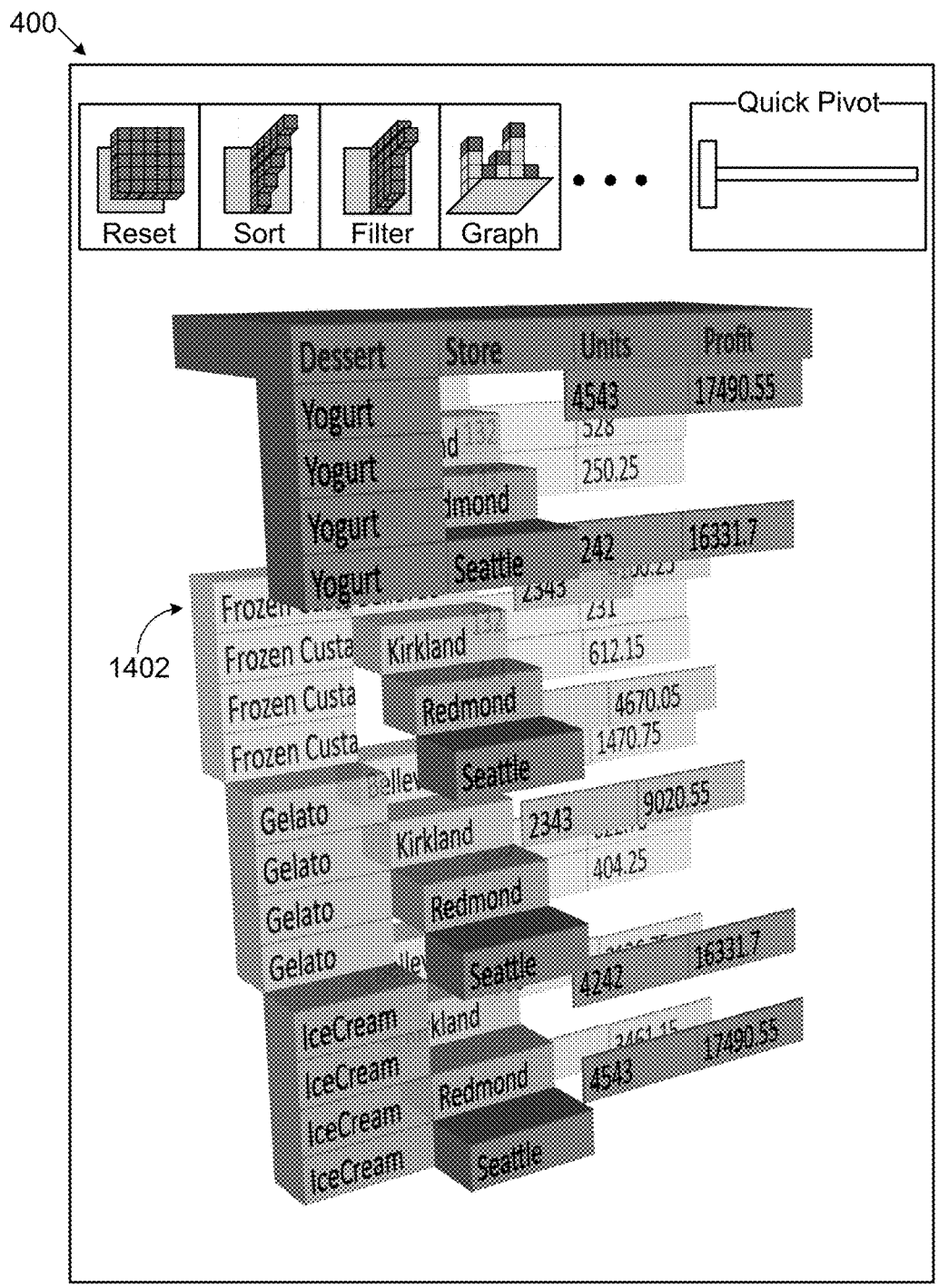
FIG. 14 is a diagram illustrating an alternate implementation, in simplified form, of the data visualization GUI after the user has input a rotation request that changes the point of view of the dataset that is displayed in FIG. 4, where in this alternate implementation the extrusion is akin to a scatter chart rather than a bar chart.
Figure 15:
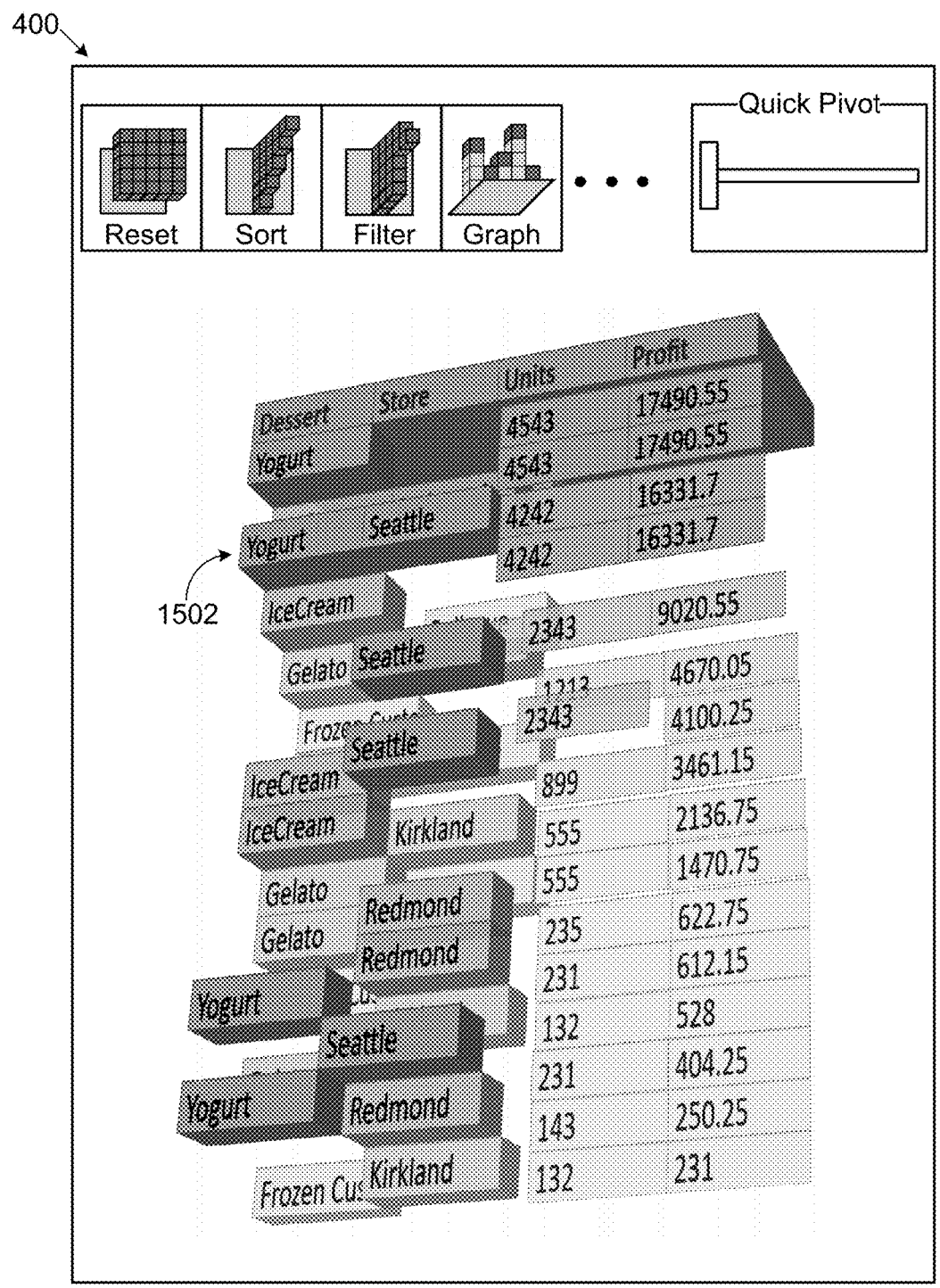
FIG. 15 is a diagram illustrating an exemplary implementation, in simplified form, of the data visualization GUI after the user has input a sorting request that is to be performed on the dataset depiction illustrated in FIG. 14, followed by another rotation request.

Referring again to FIGS. 3 and 4, FIG. 14 illustrates an alternate implementation, in simplified form, of the aforementioned data visualization GUI 400 after the user has input a rotation request, where in this alternate implementation the 3D extrusion is akin to a scatter chart rather than a bar chart. As described heretofore, when the rotation request is received a revised depiction 1402 of the dataset 300 is displayed within the GUI 400, where this revised depiction 1402 is generated from the changing point of view specified by the rotation request. The particular dataset depiction 1402 illustrated in FIG. 14 is generated from a point of view that is to the left and a little above the point of view from which the dataset depiction 402 was generated. In this dataset depiction 1402 the data elements in the dataset 300 are depicted as spans. In other words, the 3D extrusion uses a span of values that does not include the origin (e.g., scatter charts are like bar charts except that in bar charts each bar reaches all the way to zero, whereas in scatter charts each value may not reach all the way to zero).

Referring again to FIGS. 3 and 14, FIG. 15 illustrates an exemplary implementation, in simplified form, of the data visualization GUI 400 after the user has input a sorting request that is to be performed on the dataset depiction 1402 illustrated in FIG. 14, followed by another rotation request. When the sorting request and other rotation request are received a revised depiction 1502 of the dataset 300 is displayed within the GUI 400, where this revised depiction 1502 is generated based on the data sorting operation specified by the sorting request, and from the changing point of view specified by the other rotation request. The particular dataset depiction 1502 illustrated in FIG. 15 assumes that the user requested to sort the data items in the Profit column of the dataset 300 from largest to smallest numeric value, and is generated from a point of view that is significantly to the right and beneath the point of view from which the dataset depiction 1402 was generated.

It is noted that any or all of the aforementioned implementations throughout the description may be used in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

3.0 Exemplary Operating Environments

Figure 13:
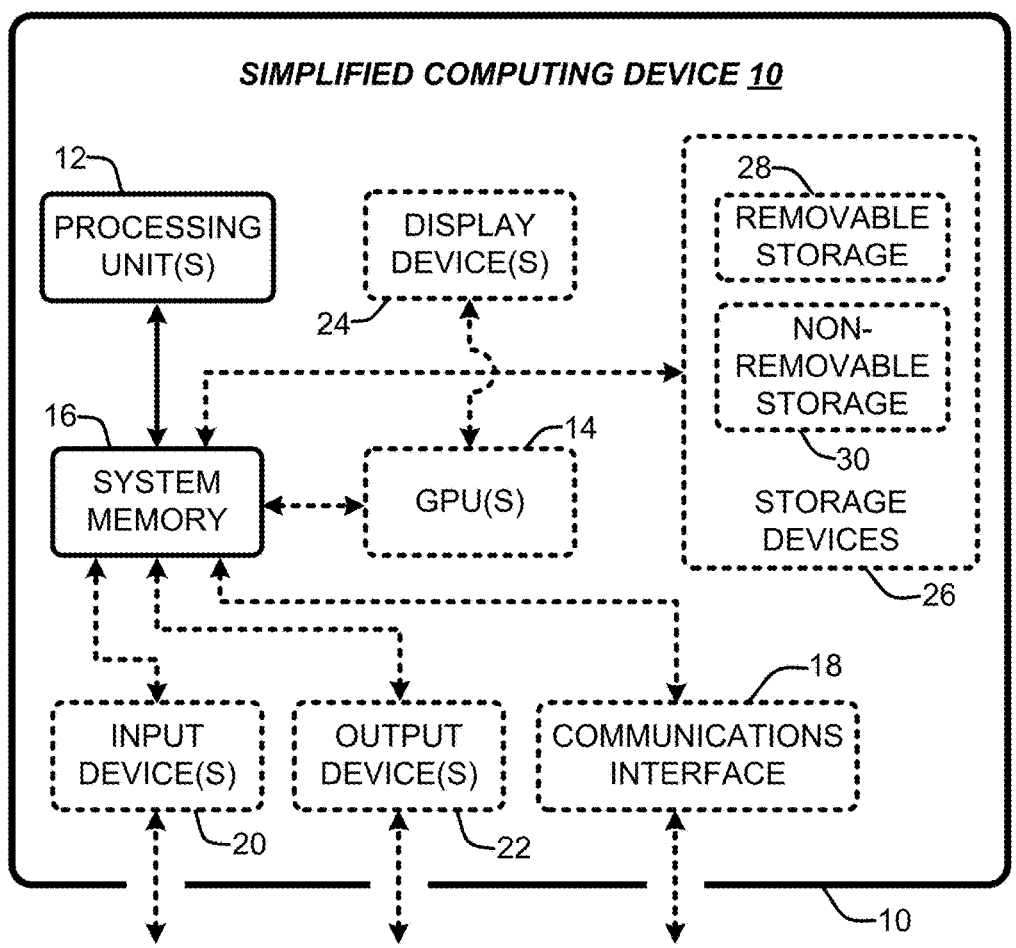
FIG. 13 is a diagram illustrating a simplified example of a general-purpose computer system on which various implementations and elements of the data visualization technique, as described herein, may be realized.

The data visualization technique implementations described herein are operational within numerous types of general purpose or special purpose computing system environments or configurations. FIG. 13 illustrates a simplified example of a general-purpose computer system on which various implementations and elements of the data visualization technique, as described herein, may be implemented. It is noted that any boxes that are represented by broken or dashed lines in the simplified computing device 10 shown in FIG. 13 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the data visualization technique implementations described herein, the device should have a sufficient computational capability and system memory to enable basic computational operations. In particular, the computational capability of the simplified computing device 10 shown in FIG. 13 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the data visualization technique implementations described herein, including input, output, control, feedback, and response to one or more users or other devices or systems associated with the data visualization technique implementations, are enabled by a variety of Natural User Interface (NUI) scenarios. The NUI techniques and scenarios enabled by the data visualization technique implementations include, but are not limited to, interface technologies that allow one or more users user to interact with the data visualization technique implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the data visualization technique implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the data visualization technique implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 13 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various data visualization technique implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The data visualization technique implementations described herein may be further described in the general context of computer-executable instructions, such as program modules, being executed by a computing device. Generally, program modules include routines, programs, objects, components, data structures, and the like, that perform particular tasks or implement particular abstract data types. The data visualization technique implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

4.0 Claim Support and Further Implementations

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation, a system is employed for allowing a user to visualize data. This system includes a computing device that includes a display device. The system also includes a computer program having program modules executable by the computing device. The computing device is directed by the program modules of the computer program to receive a dataset that includes a plurality of data items arranged in a 2D format, receive a request to visualize the dataset in three dimensions, generate a 3D visualization of the dataset based on this request, this 3D visualization adding a third dimension to this 2D arrangement of data items, the extent of the third dimension being commensurate with the type and value of the data items, this 3D visualization including an initial depiction of the dataset which is generated from a point of view that is specified by this request, and display the initial depiction of the dataset on the display device in lieu of the dataset itself.

In one implementation of the just-described system, the initial depiction of the dataset is generated from a point of view that is either precisely or substantially orthogonal to the 2D arrangement of data items and thus provides the appearance of a 2D depiction of the dataset. In another implementation the initial depiction of the dataset is generated from a prescribed point of view that is not precisely or substantially orthogonal to the 2D arrangement of data items and thus provides a 3D depiction of the dataset.

In another implementation, the computing device is further directed by the program modules of the computer program to, receive a request to manipulate the initial depiction of the dataset that is displayed on the display device, this manipulation request being initiated from within this initial depiction, and display a revised depiction of the dataset on the display device in lieu of the dataset itself, this revised depiction being based on this manipulation request. In one version of this implementation, whenever this manipulation request changes the point of view along a path of rotation, the revised depiction of the dataset is generated from this changing point of view. In one implementation of this version, the path of rotation is either pre-defined, or controlled by the user interactively. In another implementation of this version, whenever this manipulation request selects one of the data items, the path of rotation is oriented around the selected data item, and whenever this manipulation request does not select one of the data items, the path of rotation is oriented around the centroid of the initial depiction of the dataset that is displayed on the display device. In another version of this implementation, the 2D arrangement of data items includes a plurality of columns and one or more rows, and whenever this manipulation request selects one or more of the columns, the revised depiction of the dataset adds the third dimension to just the data items in the selected one or more columns. In another version of this implementation, this manipulation request specifies a data operation that includes one of: a data sorting operation, or a data filtering operation, or a data graphing operation, or a data editing operation.

In another implementation, whenever the point of view from which a given depiction of the dataset is generated is not precisely or substantially orthogonal to the 2D arrangement of data items and thus provides a 3D depiction of the dataset, the intensity of each of the data items in the 2D arrangement of data items is determined based on the distance from the point of view to the data item, this intensity decreasing as this distance increases. In another implementation, the 2D arrangement of data items includes a plurality of columns and one or more rows, and the extent of the third dimension is determined for each of the columns independently. In another implementation, one or more of the data items is a text string, and the extent of the third dimension for each of these one or more of the data items is determined using a prescribed scoring function that includes one of: an alphabetic scoring function, or a frequency of occurrence scoring function. In another implementation, the program module for displaying the initial depiction of the dataset on the display device in lieu of the dataset itself includes a program module for displaying the value of each of the data items on top of the third dimension that is added thereto. In another implementation, one or more of the data items has a numeric value, and the extent of the third dimension for each of these one or more of the data items is determined based on its numeric value.

The implementations described in any of the previous paragraphs in this section may also be combined with each other, and with one or more of the implementations and versions described prior to this section. For example, some or all of the preceding implementations and versions may be combined with the foregoing implementation where the program module for displaying the initial depiction of the dataset on the display device in lieu of the dataset itself includes a program module for displaying the value of each of the data items on top of the third dimension that is added thereto.

In another implementation, a system is employed for allowing a user to visualize data. This particular system includes a computing device that includes a display device, and one or more different user input mechanisms which are utilized by the user to input requests into the computing device. The system also includes a computer program having program modules executable by the computing device. The computing device is directed by the program modules of the computer program to receive a dataset that includes a plurality of data items arranged in a 2D format, receive a request to visualize the dataset in three dimensions, generate a 3D visualization of the dataset based on this request, this 3D visualization adding a third dimension to the 2D arrangement of data items, the extent of the third dimension being commensurate with the type and value of the data items, this 3D visualization including an initial depiction of the dataset which is generated from a point of view that is specified by this request, display the initial depiction of the dataset on the display device in lieu of the dataset itself, receive a request to manipulate the initial depiction of the dataset, and display a revised depiction of the dataset on the display device in lieu of the dataset itself, this revised depiction being based on this manipulation request.

In one implementation of the just-described system, the user input mechanisms include one or more of: a physical keyboard that is either integrated into the computing device or externally connected thereto; or a mouse that is externally connected to the computing device; or a handheld remote controller that is externally connected to the computing device; or a trackpad that is either integrated into the computing device or externally connected thereto. In another implementation, the computing device is touch-enabled, and the user input mechanisms include one or more of: finger-based screen-contacting gestures that are made by the user; or stylus-based screen-contacting gestures that are made by the user. In another implementation, the computing device is voice-enabled, and the user input mechanisms include speech that the user utters. In another implementation, the computing device is vision-enabled, and the user input mechanisms include one or more of: gaze-based gestures that are made by the user; or hand-based in-air gestures that are made by the user. In another implementation, the computing device is motion-enabled, and the user input mechanisms include movements of the computing device that are made by the user.

In another implementation, a data visualization system includes: one or more computing devices, these computing devices being in communication with each other via a computer network whenever there is a plurality of computing devices; and a computer program having program modules executable by the one or more computing devices, the one or more computing devices being directed by the program modules of the computer program to, receive a dataset that includes a plurality of data items arranged in a 2D format, receive a request to visualize the dataset in three dimensions, generate a 3D visualization of the dataset based on this request, this 3D visualization adding a third dimension to the 2D arrangement of data items, the extent of the third dimension being commensurate with the type and value of the data items, this 3D visualization including a depiction of the dataset which is generated from a point of view that is specified by this request, and output the depiction of the dataset.

In another implementation, a data visualization system is implemented by a means for allowing a user to visualize data. The data visualization system includes a computing device that includes a display device and a processor configured to execute a reception step for receiving a dataset that includes a plurality of data items arranged in a 2D format, another reception step for receiving a request to visualize the dataset in three dimensions, a visualization generation step for generating a 3D visualization of the dataset based on this request, this 3D visualization adding a third dimension to the 2D arrangement of data items, the extent of the third dimension being commensurate with the type and value of the data items, this 3D visualization including an initial depiction of the dataset which is generated from a point of view that is specified by this request, and a display step for displaying the initial depiction of the dataset on the display device in lieu of the dataset itself.

In one version of the just-described data visualization system, the processor is further configured to execute yet another reception step for receiving a request to manipulate the initial depiction of the dataset that is displayed on the display device, this manipulation request being initiated from within this initial depiction, and another display step for displaying a revised depiction of the dataset on the display device in lieu of the dataset itself, this revised depiction being based on this manipulation request.

In another implementation, a data visualization system is implemented by a means for allowing a user to visualize data. This particular data visualization system includes a computing device that includes a display device, and one or more different user input means for allowing the user to input requests into the computing device. The computing device also includes a processor configured to execute a reception step for receiving a dataset that includes a plurality of data items arranged in a 2D format, another reception step for receiving a request to visualize the dataset in three dimensions, a visualization generation step for generating a 3D visualization of the dataset based on this request, this 3D visualization adding a third dimension to the 2D arrangement of data items, the extent of the third dimension being commensurate with the type and value of the data items, this 3D visualization including an initial depiction of the dataset which is generated from a point of view that is specified by this request, a display step for displaying the initial depiction of the dataset on the display device in lieu of the dataset itself, yet another reception step for receiving a request to manipulate the initial depiction of the dataset, and another display step for displaying a revised depiction of the dataset on the display device in lieu of the dataset itself, this revised depiction being based on this manipulation request.

In one implementation of the just-described data visualization system, the user input means includes one or more of: a physical keyboard that is either integrated into the computing device or externally connected thereto; or a mouse that is externally connected to the computing device; or a handheld remote controller that is externally connected to the computing device; or a trackpad that is either integrated into the computing device or externally connected thereto. In another implementation, the computing device is touch-enabled, and the user input means includes one or more of: finger-based screen-contacting gestures that are made by the user; or stylus-based screen-contacting gestures that are made by the user. In another implementation, the computing device is voice-enabled, and the user input means includes speech that the user utters. In another implementation, the computing device is vision-enabled, and the user input means includes one or more of: gaze-based gestures that are made by the user; or hand-based in-air gestures that are made by the user. In another implementation, the computing device is motion-enabled, and the user input means include movements of the computing device that are made by the user.

Wherefore, what is claimed is:

1. A system for allowing a user to visualize data, comprising:
    a computing device comprising a display device; and
    a computer program having program modules executable by the computing device, the computing device being directed by the program modules of the computer program to:
        receive a dataset of data items, wherein each data item represents a particular data type and the dataset as a whole comprises data items that collectively represent a plurality of different data types, and wherein each data item is associated with a 2D region in a 2D arrangement of the data items;
        receive a request to visualize the dataset in three dimensions;
        generate a three-dimensional (3D) visualization of the dataset based on the request, the 3D visualization adding a third dimension to at least some of the data items of the 2D arrangement of the data items, an extent of the third dimension for a data item being commensurate with a type and a value of the data item, the 3D visualization comprising an initial 3D depiction of the dataset that is generated from a point of view that is specified by the request;
        display the initial 3D depiction of the dataset on the display device in lieu of the dataset itself, wherein the initial 3D depiction of the dataset is manipulatable;
        receive a request to manipulate the initial 3D depiction of the dataset, wherein the request specifies at least one data operation to be performed with respect to the initial 3D depiction;
        perform the at least one data operation with respect to the initial 3D depiction to create a manipulated 3D depiction of the dataset, wherein performing the at least one data operation comprises moving at least one data item to a different 2D region in the 2D arrangement of the data items; and
        display the manipulated 3D depiction of the dataset instead of the initial 3D depiction of the dataset.

2. The system of claim 1, wherein the point of view is either precisely or substantially orthogonal to the 2D arrangement of the data items and thus appears to be a 2D depiction of the dataset.

3. The system of claim 1, wherein the point of view is not precisely or substantially orthogonal to the 2D arrangement of the data items.

4. The system of claim 1, wherein the request to manipulate the initial 3D depiction of the dataset changes the point of view along a path of rotation, and the manipulated 3D depiction of the dataset is generated from a different point of view.

5. The system of claim 4, wherein the path of rotation is either pre-defined, or controlled by the user interactively.

6. The system of claim 4, wherein:
    whenever the request to manipulate the initial 3D depiction of the dataset selects one of the data items, the path of rotation is oriented around the selected data item; and
    whenever the request to manipulate the initial 3D depiction of the dataset does not select one of the data items, the path of rotation is oriented around a centroid of the initial 3D depiction of the dataset that is displayed on the display device.

7. The system of claim 1, wherein the 2D arrangement of the data items comprises a plurality of columns and one or more rows, and whenever the manipulation request selects one or more of the columns, the manipulated 3D depiction of the dataset adds the third dimension to just the data items in the selected one or more columns.

8. The system of claim 1, wherein the at least one data operation comprises at least one of:
    a data sorting operation, or
    a data filtering operation, or
    a data graphing operation, or
    a data editing operation.

9. The system of claim 1, wherein, whenever the point of view from which a given depiction of the dataset is generated is not precisely or substantially orthogonal to the 2D arrangement of the data items, intensities of the data items in the 2D arrangement of the data items are determined based on distances from the point of view to the data items, an intensity for a particular data item decreasing as a distance from the point of view to the particular data item increases.

10. The system of claim 1, wherein the 2D arrangement of the data items comprises a plurality of columns and one or more rows, and an extent of the third dimension is determined for each column independently.

11. The system of claim 1, wherein one or more of the data items comprises a text string, and an extent of the third dimension for each text string is determined using a prescribed scoring function comprising one of:
an alphabetic scoring function, or
a frequency of occurrence scoring function.

12. The system of claim 1, wherein the program module for displaying the initial 3D depiction of the dataset on the display device in lieu of the dataset itself comprises a program module for displaying the value of each of the data items on top of the third dimension that is added thereto.

13. A system for allowing a user to visualize data, comprising:
a computing device comprising a display device;
one or more different user input mechanisms that are utilized by the user to input requests into the computing device; and
a computer program having program modules executable by the computing device, the computing device being directed by the program modules of the computer program to:
receive a dataset of data items, wherein each data item represents a particular data type and the dataset as a whole comprises data items that collectively represent a plurality of different data types, and wherein each data item is associated with a 2D region in a 2D arrangement of the data items;
receive a request to visualize the dataset in three dimensions;
generate a three-dimensional (3D) visualization of the dataset based on the request, the 3D visualization adding a third dimension to at least some of the data items of the 2D arrangement of the data items, the 3D visualization comprising an initial 3D depiction of the dataset that is generated from a point of view that is specified by the request;
display the initial 3D depiction of the dataset on the display device in lieu of the dataset itself, wherein the initial 3D depiction of the dataset is manipulatable;
receive a request to manipulate the initial 3D depiction of the dataset, wherein the request specifies at least one data operation to be performed with respect to the initial 3D depiction;
perform the at least one data operation with respect to the initial 3D depiction to create a manipulated 3D depiction of the dataset, wherein performing the at least one data operation comprises moving at least one data item to a different 2D region in the 2D arrangement of the data items; and
display a revised depiction of the dataset on the display device in lieu of the dataset itself, the revised depiction being based on the manipulated 3D depiction of the dataset.

14. The system of claim 13, wherein the one or more different user input mechanisms comprise one or more of:
a physical keyboard that is either integrated into the computing device or externally connected thereto; or
a mouse that is externally connected to the computing device; or
a handheld remote controller that is externally connected to the computing device; or
a trackpad that is either integrated into the computing device or externally connected thereto.

15. The system of claim 13, wherein the computing device is touch-enabled, and the one or more different user input mechanisms comprise one or more of:
finger-based screen-contacting gestures that are made by the user; or
stylus-based screen-contacting gestures that are made by the user.

16. The system of claim 13, wherein the computing device is voice-enabled, and the one or more different user input mechanisms comprise speech that the user utters.

17. The system of claim 13, wherein the computing device is vision-enabled, and the one or more different user input mechanisms comprise one or more of:
gaze-based gestures that are made by the user; or
hand-based in-air gestures that are made by the user.

18. The system of claim 13, wherein the computing device is motion-enabled, and the one or more different user input mechanisms comprise movements of the computing device that are made by the user.

19. A computer-implemented process for generating a dataset depiction, comprising:
receiving a dataset of data items, wherein each data item represents a particular data type and the dataset as a whole comprises data items that collectively represent a plurality of different data types, and wherein each data item is associated with a 2D region in a 2D arrangement of the data items;
receiving a request to visualize the dataset in three dimensions;
generating a three-dimensional (3D) visualization of the dataset based on the request, the 3D visualization adding a third dimension to at least some of the data items of the 2D arrangement of the data items, the extent of the third dimension for a data item being commensurate with a type and a value of the data item, the 3D visualization comprising an initial 3D depiction of the dataset;
displaying the initial 3D depiction of the dataset on a display device in lieu of the dataset itself, wherein the initial 3D depiction of the dataset is manipulatable;
receiving a request to manipulate the initial 3D depiction of the dataset, wherein the request specifies at least one data operation to be performed with respect to the initial 3D depiction;
performing the at least one data operation with respect to the initial 3D depiction to create a manipulated 3D depiction of the dataset; and
displaying the manipulated 3D depiction of the dataset instead of the initial 3D depiction of the dataset.

* * * * *